(12) United States Patent
Sano

(10) Patent No.: US 10,675,986 B2
(45) Date of Patent: Jun. 9, 2020

(54) DRIVING SUPPORT DEVICE, DRIVING SUPPORT SYSTEM AND DRIVING SUPPORT METHOD

(71) Applicant: Sumitomo Electric Industries, Ltd., Osaka-shi (JP)

(72) Inventor: Yuki Sano, Osaka (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 200 days.

(21) Appl. No.: 15/568,629

(22) PCT Filed: Aug. 2, 2016

(86) PCT No.: PCT/IB2016/054625
§ 371 (c)(1),
(2) Date: Oct. 23, 2017

(87) PCT Pub. No.: WO2016/193960
PCT Pub. Date: Aug. 12, 2016

(65) Prior Publication Data
US 2018/0141461 A1    May 24, 2018

(30) Foreign Application Priority Data
Jun. 5, 2015    (JP) .................................. 2015-114872

(51) Int. Cl.
*B60L 15/20* (2006.01)
*G08G 1/0967* (2006.01)
(Continued)

(52) U.S. Cl.
CPC ........... *B60L 15/2045* (2013.01); *B60L 15/20* (2013.01); *B60L 15/2009* (2013.01);
(Continued)

(58) Field of Classification Search
CPC .. B60L 15/2045; B60L 15/2009; B60L 15/20; B60W 30/181; B60W 30/18127;
(Continued)

(56) References Cited

U.S. PATENT DOCUMENTS 6,629,515 B1 * 10/2003 Yamamoto et al. ........................
B60L 15/2045
123/179.4
9,108,629 B2 * 8/2015 Otake .................. B60L 15/2045
(Continued)

FOREIGN PATENT DOCUMENTS

JP        2010-244308 A      10/2010
JP        2011253379 A  *  12/2011  ............... G08G 1/09

OTHER PUBLICATIONS

Espacenet translation of JP2011253379A, Kuretake, Dec. 15, 2011, Driving Support Device, 37 pages (Year: 2011).*

*Primary Examiner* — Dale W Hilgendorf
(74) *Attorney, Agent, or Firm* — Baker Botts, L.L.P.; Michael A. Sartori

(57) ABSTRACT

The driving support device is provided with: a speed acquisition unit for acquiring speed information of a vehicle; a distance information acquisition unit for acquiring information on the distance between the vehicle and an intersection; a running state judgment unit for judging a dangerous running state to be determined by a stop condition for causing the vehicle to stop in front of the intersection and an entry condition for causing the vehicle to enter the intersection, on the basis of the distance to the intersection, the speed of the vehicle, and signal information; a determination unit for determining whether to cause the vehicle to stop at the intersection or to pass through the intersection if the running state judgment unit judges that the vehicle is in the dangerous running state; and a specification unit for specifying a regeneration time zone when running accompanied with
(Continued)

regenerative braking is performed or an inertia time zone when inertia running is performed, before the vehicle arrives at the intersection, depending on a result of determination by the determination unit.

13 Claims, 13 Drawing Sheets

(51) Int. Cl.
*B60W 30/18* (2012.01)
*G08G 1/09* (2006.01)
*B60W 50/00* (2006.01)

(52) U.S. Cl.
CPC .... *B60W 30/181* (2013.01); *B60W 30/18127* (2013.01); *G08G 1/09* (2013.01); *G08G 1/096708* (2013.01); *B60W 50/0097* (2013.01); *B60W 2510/244* (2013.01); *B60W 2520/04* (2013.01); *Y02T 10/7258* (2013.01)

(58) Field of Classification Search
CPC ........ B60W 2520/04; B60W 2510/244; G08G 1/096708; G08G 1/09
See application file for complete search history.

(56) References Cited

U.S. PATENT DOCUMENTS

| | | | |
|---|---|---|---|
| 9,437,110 B2 * | 9/2016 | Otake | G08G 1/096741 |
| 2015/0183433 A1 * | 7/2015 | Suzuki | B60W 30/18127 |
| | | | 701/96 |
| 2017/0015328 A1 * | 1/2017 | Oguri | B60W 30/18127 |

* cited by examiner

DRIVING SUPPORT DEVICE, DRIVING SUPPORT SYSTEM AND DRIVING SUPPORT METHOD

CROSS-REFERENCE TO RELATED APPLICATIONS

This application is the national phase under 35 U.S.C. § 371 of PCT International Application No. PCT/IB2016/054625 which has an International filing date of Aug. 2, 2016 and designated the United States of America.

FIELD

The present invention relates to a driving support device for supporting driving of a vehicle, a driving support system provided with the driving support device, and a driving support method.

BACKGROUND

Various techniques including a technique concerning stop control for causing a running vehicle to decelerate and stop, a technique concerning dilemma control considering a switching time period of a signal, a technique for collecting running data or the like of a vehicle, and a technique for detecting the position of a vehicle are applied to support for safe driving of a vehicle.

For example, a vehicle driving support device, which is designed to calculate an arrival time period to arrival of a vehicle at the next signal in a travelling direction, acquire a change time period to change of a signal from green to yellow or red, and notify the driver that it is difficult to pass during a green signal if the arrival time period is longer than the change time period, has been disclosed (see Japanese Patent Application Laid-Open No. 2010-244308).

SUMMARY

A device in Japanese Patent Application Laid-Open No. 2010-244308, does not consider driving support concerning fuel-efficient running.

However, the device can prompt the driver to decelerate the vehicle if it is necessary to stop the vehicle at an intersection.

The present disclosure has been made in view of such a situation, and the object thereof is to provide a driving support device capable of supporting fuel-efficient running, a driving support system provided with the driving support device, and a driving support method.

A driving support device according to the embodiment of the present disclosure is a driving support device for receiving signal information of a traffic signal located at an intersection and supporting driving of a vehicle, including a speed acquisition unit for acquiring speed information of a vehicle, a distance information acquisition unit for acquiring information on a distance between the vehicle and an intersection, a running state judgment unit for judging a dangerous running state to be determined by a stop condition for causing the vehicle to stop in front of the intersection and an entry condition for causing the vehicle to enter the intersection, on the basis of a distance to the intersection, a speed of the vehicle, and the signal information, a determination unit for determining whether to cause the vehicle to stop at the intersection or to pass through the intersection if the running state judgement unit judges that the vehicle is in the dangerous running state, and a specification unit for specifying a regeneration time zone when running accompanied with regenerative braking is performed or an inertia time zone when inertia running is performed, before the vehicle arrives at the intersection, depending on a result of determination by the determination unit.

A driving support system according to the embodiment of the present disclosure is a driving support system including a driving support device according to any one of the present invention, and a transmitting device for transmitting signal information of a traffic signal located at an intersection, wherein the driving support device is constructed to receive signal information transmitted from the transmitting device.

A driving support method according to the embodiment of the present disclosure is a driving support method for receiving signal information of a traffic signal located at an intersection and supporting driving of a vehicle, including the steps of acquiring, at a speed acquisition unit, speed information of a vehicle, acquiring, at a distance information acquisition unit, information on a distance between the vehicle and an intersection, judging, at a running state judging unit, a dangerous running state to be determined by a stop condition for causing the vehicle to stop in front of the intersection and an entry condition for causing the vehicle to enter the intersection, on the basis of a distance to the intersection, a speed of the vehicle, and the signal information, determining, at a determination unit, whether to cause the vehicle to stop at the intersection or to pass through the intersection if it is judged that the vehicle is in the dangerous running state, and specifying, at a specification unit, a regeneration time zone when running accompanied with regenerative braking is performed or an inertia time zone when inertia running is performed, before the vehicle arrives at the intersection, depending on a result of determination by the determination unit.

It is possible with the present disclosure to support fuel-efficient running.

The above and further objects and features of the invention will more fully be apparent from the following detailed description with accompanying drawings.

DETAILED DESCRIPTION

Figure 1:
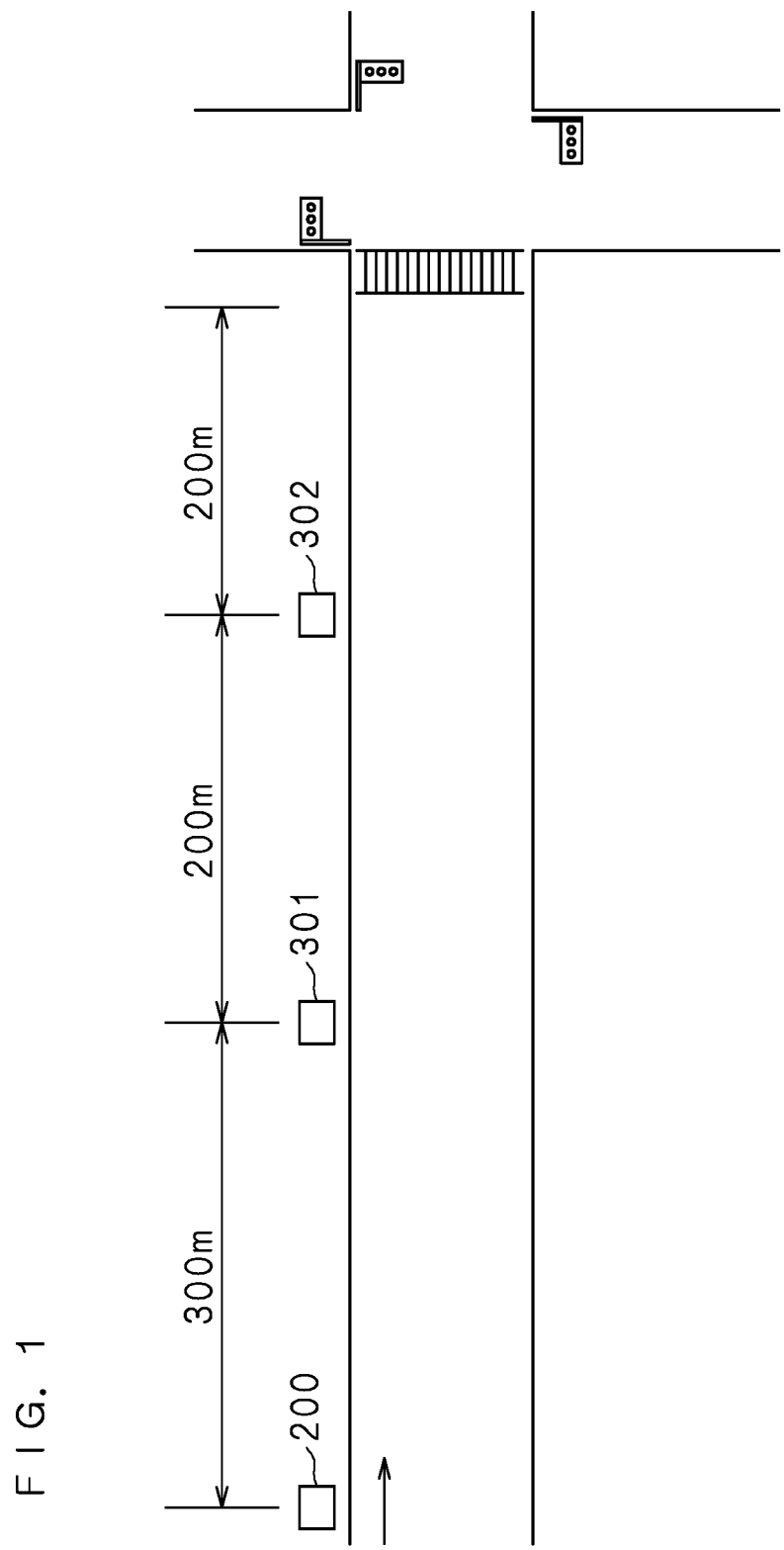
FIG. 1 A schematic view illustrating an outline of a driving support system according to the present invention.

A driving support device according to the embodiment of the present disclosure is a driving support device for receiving signal information of a traffic signal located at an intersection and supporting driving of a vehicle, including a speed acquisition unit for acquiring speed information of the vehicle, a distance information acquisition unit for acquiring information on a distance between the vehicle and the intersection, a running state judgment unit for judging a dangerous running state to be determined by a stop condition for causing the vehicle to stop in front of the intersection and an entry condition for causing the vehicle to enter the intersection, on the basis of the distance to the intersection, a speed of the vehicle, and the signal information, a determination unit for determining whether to cause the vehicle to stop at the intersection or to pass through the intersection if the running state judgement unit judges that the vehicle is in the dangerous running state, and a specification unit for specifying a regeneration time zone when running accompanied with regenerative braking is performed or an inertia time zone when inertia running is performed, before the vehicle arrives at the intersection, depending on a result of determination by the determination unit.

A driving support system according to the embodiment of the present disclosure is a driving support system including a driving support device according to any one of the present invention, and a transmitting device for transmitting signal information of a traffic signal located at an intersection, wherein the driving support device is constructed to receive signal information transmitted from the transmitting device.

A driving support method according to the embodiment of the present disclosure is a driving support method for receiving signal information of a traffic signal located at an intersection and supporting driving of a vehicle, including the steps of acquiring, at a speed acquisition unit, speed information of the vehicle, acquiring, at a distance information acquisition unit, information on a distance between the vehicle and the intersection, judging, at a running state judging unit, a dangerous running state to be determined by a stop condition for causing the vehicle to stop in front of the intersection and an entry condition for causing the vehicle to enter the intersection, on the basis of the distance to the intersection, a speed of the vehicle, and the signal information, determining, at a determination unit, whether to cause the vehicle to stop at the intersection or to pass through the intersection if it is judged that the vehicle is in the dangerous running state, and specifying, at a specification unit, a regeneration time zone when running accompanied with regenerative braking is performed or an inertia time zone when inertia running is performed, before the vehicle arrives at the intersection, depending on a result of determination by the determination unit.

The speed acquisition unit acquires speed information (speed) of a vehicle (e.g., the subject vehicle, or a vehicle equipped with the driving support device). The distance information acquisition unit acquires information on the distance between the vehicle and an intersection. The information on the distance between the vehicle and an intersection may be the distance between the vehicle and the intersection, or may be positions of the vehicle and the intersection.

The running state judgement unit judges a dangerous running state to be determined by a stop condition for causing the vehicle to stop in front of the intersection and an entry condition for causing the vehicle to enter the intersection, on the basis of the distance to the intersection, the speed of the vehicle, and signal information (including signal parameters such as a yellow signal start time point and a yellow signal time period, for example).

A dangerous running state includes a dilemma state and an option state, for example. A dilemma state is a state where the vehicle tries to stop after a yellow signal is displayed but cannot stop in front of the intersection and also cannot enter the intersection before an end time point of the yellow signal, and is a state where the vehicle cannot stop or enter the intersection safely. On the other hand, an option state is a state where the vehicle tries to stop after a yellow signal is displayed and can stop in front of the intersection and also can enter the intersection before an end time point of the yellow signal, and is an unstable state where whether the vehicle stops or enters the intersection depends on the characteristic of the driver. That is, it can be judged that the vehicle is in a dangerous running state if the state quantity of the vehicle (the position, the speed and the like of the vehicle) at a certain time point (e.g., yellow signal start time point) is in a dilemma area or an option area. In such a case, the position of the vehicle may be a relative position such as the distance from the vehicle to a stop position, or may be an absolute position such as coordinates.

The determination unit judges a dangerous running state at the running state judgement unit, and determines whether to cause the vehicle to stop at the intersection or to pass through the intersection. Whether to cause the vehicle to stop at the intersection or to pass through the intersection may be determined by choosing an easier way to avoid a dangerous running state, for example.

The specification unit specifies a regeneration time zone when running accompanied with regenerative braking is performed or an inertia time zone when inertia running is performed, before the vehicle arrives at the intersection, depending on the result of determination by the determination unit. In running accompanied with regenerative braking, a motor is utilized as a generator at the time of deceleration, for example, so that electric energy generated at this time is applied to charging of a storage battery and electric power supply to electric equipment as regenerative energy. On the other hand, in inertia running, an engine and a transmission are disconnected, so that fuel consumption is suppressed. That is, if it is determined to cause the vehicle to stop at the intersection, regenerative braking is prioritized when decelerating the vehicle and regenerative energy is used for charging of a storage battery, so that regenerative energy is recovered without waste and fuel efficiency can be improved. On the other hand, if it is determined to cause the vehicle to pass through the intersection, inertia running is performed when the speed of the vehicle reaches a speed with which the vehicle can safely pass through the intersection, so that fuel consumption can be suppressed, and therefore it is possible to support fuel-efficient running.

The driving support device according to the embodiment of the present disclosure, further including a charge state acquisition unit for acquiring a charge state of a storage battery mounted on the vehicle, wherein the specification unit is constructed to specify the regeneration time zone or the inertia time zone depending on the charge state acquired by the charge state acquisition unit.

The charge state acquisition unit acquires the charge state of a storage battery mounted on the vehicle. The specification unit specifies a regeneration time zone or an inertia time zone depending on the charge state acquired by the charge state acquisition unit. If the storage battery is in a chargeable state in the case of decelerating the vehicle (if the storage battery is not in a full charge state or is in a state where the charge state is not at the upper limit), for example, regenerative energy can be recovered by specifying a regeneration time zone and prioritizing a regenerative brake. On the other hand, if the charge state of the storage battery is at the upper limit and the storage battery is in a nonchargeable state, fuel consumption can be suppressed by specifying an inertia time zone and prioritizing inertia running.

The driving support device according to the embodiment of the present disclosure, further including a calculation unit for calculating regenerative energy recoverable before the vehicle stops, if the determination unit determines to cause the vehicle to stop at the intersection, wherein the specification unit is constructed to specify the regeneration time zone or the inertia time zone so that the storage battery is put into a full charge state when the vehicle stops at the intersection if regenerative energy calculated by the calculation unit is larger than charging energy required for putting the storage battery into the full charge state.

If the determination unit determines to cause the vehicle to stop at the intersection, the calculation unit calculates regenerative energy recoverable before the vehicle stops. Recoverable regenerative energy Eg can be found by a formula of $Eg=(S-R) \times e$, wherein kinetic energy of the vehicle is denoted by S, energy required for running of the vehicle before the vehicle stops at the intersection is denoted by R, and power generation efficiency of a generator or an alternator is denoted by e, for example. The kinetic energy S of the vehicle is calculated from the vehicle weight and the speed. R denotes work done by running resistance composed of air resistance, tire rolling resistance, slope resistance and acceleration resistance. Air resistance is represented as $k \times V^2$, tire rolling resistance is represented as $\mu \times M \times G \times \cos \theta$, slope resistance is represented as $M \times G \times \sin \theta$, and acceleration resistance is represented as $M \times a$. Here, k denotes an air resistance coefficient, $\mu$ denotes a rolling resistance coefficient, M denotes vehicle weight, G denotes a gravitational acceleration, and $\theta$ denotes a tilt angle of the road surface. It is to be noted that the tilt angle of the road surface may be acquired from a map database, the vehicle weight, the air resistance coefficient and the gravitational acceleration may be preliminarily stored in a storage unit, and the rolling resistance coefficient may be estimated utilizing a tire pressure sensor or the like. The vehicle weight may be corrected utilizing a seat sensor, a fuel meter or the like. The vehicle speed is acquired using a vehicle speed sensor, and the vehicle acceleration is acquired using an acceleration sensor. If regenerative energy calculated by the calculation unit is larger than charging energy required for putting the storage battery into a full charge state, the specification unit specifies a regeneration time zone or an inertia time zone so that the storage battery is put into a full charge state when the vehicle stops at the intersection. By combining running accompanied with regenerative braking and inertia running so that the storage battery is put into a full charge state when the vehicle stops, it becomes possible to recover regenerative energy without waste while suppressing fuel consumption and increasing running distance.

The driving support device according to the embodiment of the present disclosure, wherein the charge state acquisition unit is construed to acquire a charging stop state of the storage battery, and the specification unit is constructed to specify the inertia time zone from a time point of acquisition if the charge state acquisition unit acquires the charging stop state.

The charge state acquisition unit acquires a charging stop state of the storage battery. A charging stop state is, for example, a state where the SOC (state of charge) is at the upper limit, is a state where the storage battery is in a full charge state, and can be regarded as a state where the storage battery cannot be charged any more. If the charge state acquisition unit acquires a charging stop state, the specification unit specifies an inertia time zone from the time point of acquisition. If the storage battery is put into a full charge state in the case where the storage battery is charged using regenerative energy, for example, running distance can be increased and fuel efficiency can be improved by switching to inertia running.

The driving support device according to the embodiment of the present disclosure, wherein the charge state acquisition unit is constructed to acquire a charging start state of the storage battery, and the specification unit is constructed to specify the regeneration time zone from a time point of acquisition if the charge state acquisition unit acquires the charging start state.

The charge state acquisition unit acquires a charging start state of the storage battery. The charging start state is, for example, a state where the SOC (state of charge) is not at the upper limit and the storage battery is in a chargeable state, and is a state where charging is to be started. If the charge state acquisition unit acquires a charging start state, the specification unit specifies a regeneration time zone from the time point of acquisition. If the charge state of the storage battery is not at the upper limit and the storage battery is put into a chargeable state in the case where the vehicle performs inertia running, regenerative energy can be recovered without waste by switching to running accompanied with regenerative braking and charging the storage battery using regenerative energy.

The driving support device according to the embodiment of the present disclosure, further including an adjustment unit for adjusting a regenerative power generation amount so that the storage battery is put into the full charge state when the vehicle stops at the intersection if the determination unit determines to cause the vehicle to stop at the intersection and the vehicle performs running accompanied with regenerative braking.

If the determination unit determines to cause the vehicle to stop at an intersection and the vehicle performs running accompanied with regenerative braking, the adjustment unit adjusts the regenerative power generation amount so that the storage battery is put into a full charge state when the vehicle stops at the intersection. The regenerative power generation amount is adjusted to be (Wp+Wc), wherein charging energy required for putting the storage battery into a full charge state is denoted by Wp, and a power consumption amount (a power consumption amount of electric equipment, for example) required before the vehicle stops is denoted by Wc. Adjustment of the regenerative power generation amount may be achieved by adjusting exciting current of the generator. This makes it possible to put the storage battery into a full charge state, and therefore regenerative energy can be recovered without waste.

The driving support device according to the embodiment of the present disclosure, wherein the specification unit is constructed to specify the regeneration time zone if regenerative energy calculated by the calculation unit is smaller than charging energy required for putting the storage battery into the full charge state.

If regenerative energy calculated by the calculation unit is smaller than charging energy required for putting the storage battery into a full charge state, the specification unit specifies a regeneration time zone. This makes it possible to allocate regenerative energy all to charging of the storage battery, and therefore regenerative energy can be all recovered.

The driving support device according to the embodiment of the present disclosure, wherein the specification unit is constructed to specify the inertia time zone if the determination unit determines to cause the vehicle to pass through the intersection.

If the determination unit determines to cause the vehicle to pass through the intersection, the specification unit specifies an inertia time zone. Fuel consumption can be suppressed by, for example, causing the vehicle to perform inertia running and pass through the intersection.

The driving support device according to the embodiment of the present disclosure, further comprising a target speed calculation unit for calculating a target speed satisfying the entry condition, wherein the specification unit is constructed to specify the inertia time zone from a time point when the vehicle accelerates or decelerates and a speed of the vehicle reaches the target speed.

The target speed calculation unit calculates a target speed which satisfies an entry condition. The target speed is a speed at which the vehicle safely passes through the intersection. The specification unit specifies an inertia time zone from a time point when the vehicle accelerates or decelerates and the speed of the vehicle reaches the target speed, for example. In the case where the vehicle is caused to pass through the intersection, fuel consumption can be suppressed by causing the vehicle to perform inertia running after the vehicle accelerates and the speed of the vehicle reaches the target speed.

The driving support device according to the embodiment of the present disclosure, further comprising a running control unit for making control so that the vehicle performs running accompanied with regenerative braking or inertia running depending on the regeneration time zone or the inertia time zone specified by the specification unit.

The running control unit makes control so that the vehicle performs running accompanied with regenerative braking or inertia running depending on a regeneration time zone or an inertia time zone specified by the specification unit. This makes it possible to make running control by switching between running accompanied with regenerative braking and inertia running.

The following description will make an explanation with reference to drawings illustrating embodiments of a driving support device, a driving support system and a driving support method according to the present invention. FIG. 1 is a schematic view illustrating an outline of a driving support system according to the present invention. In the driving support system according to the present invention, on-road devices 301 and 302 are located along a road at suitable separation distance (e.g., 200 m) from a stop position. Moreover, an optical beacon 200 is located on the upstream side of the on-road device 301 (approximately 300 m upstream away from the on-road device 301, for example).

A plurality of intersections like the intersection illustrated in FIG. 1 are provided, and each intersection is set as either an automatic speed control object intersection where automatic speed control of a vehicle is performed or an automatic speed control non-object intersection where automatic speed control of a vehicle is not performed. Since an intersection is discriminated as an automatic speed control object intersection based on an intersection where many traffic accidents occur, an intersection with poor visibility (a curve exists immediately in front of an intersection or the like), a time zone when the traffic volume is somewhat large, night time, a time zone when many traffic accidents occur, presence or absence of equipment failure, or the like, for example, it is practical that an automatic speed control object intersection is changeable according to time. In this sense, information on presence or absence of an automatic speed control object intersection may be obtained from on-road devices. At an automatic speed control object intersection, a driving support device performs speed control of a vehicle running on a road on the upstream side of the intersection so as to support driving by the driver. The subject vehicle equipped with a driving support device will also be hereinafter referred to as a vehicle.

The on-road devices 301 and 302 are each an ultrasonic detector, an IC tag, a magnetic nail, an optical sensor or the like, for example, and is designed to specify a communication spot by sensing a radio wave, a sound wave, light, magnetism or the like. The on-road devices 301 and 302 each have a communication area for communication with a driving support device on the road. When the vehicle passes through the communication area, the driving support device receives a signal, which indicates that the vehicle passes through the communication area, from an on-road device 301 or 302. It is to be noted that the on-road devices 301 and 302 may be designed to make unidirectional communication or bidirectional communication with a driving support device. The on-road devices 301 and 302 may also be not aimed at communication but simply designed to output a signal to be used for measurement.

The optical beacon 200 has a communication area for communication with a driving support device on the road. When a vehicle passes through the communication area, the driving support device receives predetermined information from the optical beacon 200. The predetermined information is, for example, positional information of a communication spot, positional information of a stop position (e.g., a distance from a stop position, or an absolute position of a stop position), positional information of the on-road devices 301 and 302 (e.g., a distance from a stop position to a communication area, or an absolute position of a communication area), signal information of a signal (e.g., yellow signal start time point and yellow signal time period), or the like. It is to be noted that a radio beacon, DSRC (Dedicated Short Range Communication) or the like can be used instead of the optical beacon 200.

In the case where the vehicle runs on a road toward an intersection, the driving support device acquires predetermined information through communication with the optical beacon 200. For example, the driving support device can confirm that the distance to the stop position at this time point is 700 m, for example. When the vehicle further runs on the road toward the intersection and the driving support device communicates with the on-road device 301, the driving support device can confirm that the position of the vehicle is at a point 400 m away from the stop position. That is, the driving support device can correct the distance to the stop position. The subject vehicle position may be estimated and the distance to the stop position may be corrected, by comparing information, which is acquired by an external sensor such as a camera, a radar or an ultrasonic sensor, for example, with a map database. The same applies to the case where the driving support device communicates with the on-road device 302. This allows the driving support device to accurately grasp the distance to the stop position preliminarily at an upstream point of the intersection.

In the case where the intersection is an automatic speed control object intersection, the driving support device judges the state quantity of the vehicle (the distance from the stop position, the speed and the like of the vehicle) at a certain time point (e.g., yellow signal start time point) is in a dangerous running state to be determined by a stop condition for causing the vehicle to stop in front of the intersection and an entry condition for causing the vehicle to enter the intersection, on the basis of the distance to the stop position (intersection), the speed of the vehicle, a yellow signal start time point and a yellow signal time period of a signal located at the intersection, a predetermined standard deceleration, and the like. A standard deceleration is to simply indicate a speed change of the vehicle, and is irrelevant to the operation content of braking operation or the timing of operation. The standard deceleration means a deceleration found when deceleration operation is performed after a time period (e.g., two seconds or longer) sufficiently longer than a reflex (0.5 seconds) passes from a stop judgement time point in the case where the signal changes to yellow and braking of the vehicle starts, for example. That is, the standard deceleration means a deceleration found when it is intended to stop the vehicle in a relaxed manner without applying heavy braking. It is to be noted that the timing for carrying out speed control at a standard deceleration by the driving support device is not limited to a time period sufficiently longer than a reflex, or a time period for a reflex. In general, a standard deceleration is approximately 2 to 3 m/s$^2$ on a flat and dry road surface.

If it is judged that the vehicle is in a dangerous running state, the driving support device judges whether to cause the vehicle to pass through the intersection or to stop at the intersection. In order to avoid a dangerous running state, the driving support device performs processing to decelerate the vehicle at a gentle deceleration in the case of causing the vehicle to stop, for example, or performs processing to accelerate the vehicle at a gentle acceleration in the case of causing the vehicle to enter the intersection (to pass through the intersection).

Figure 2:
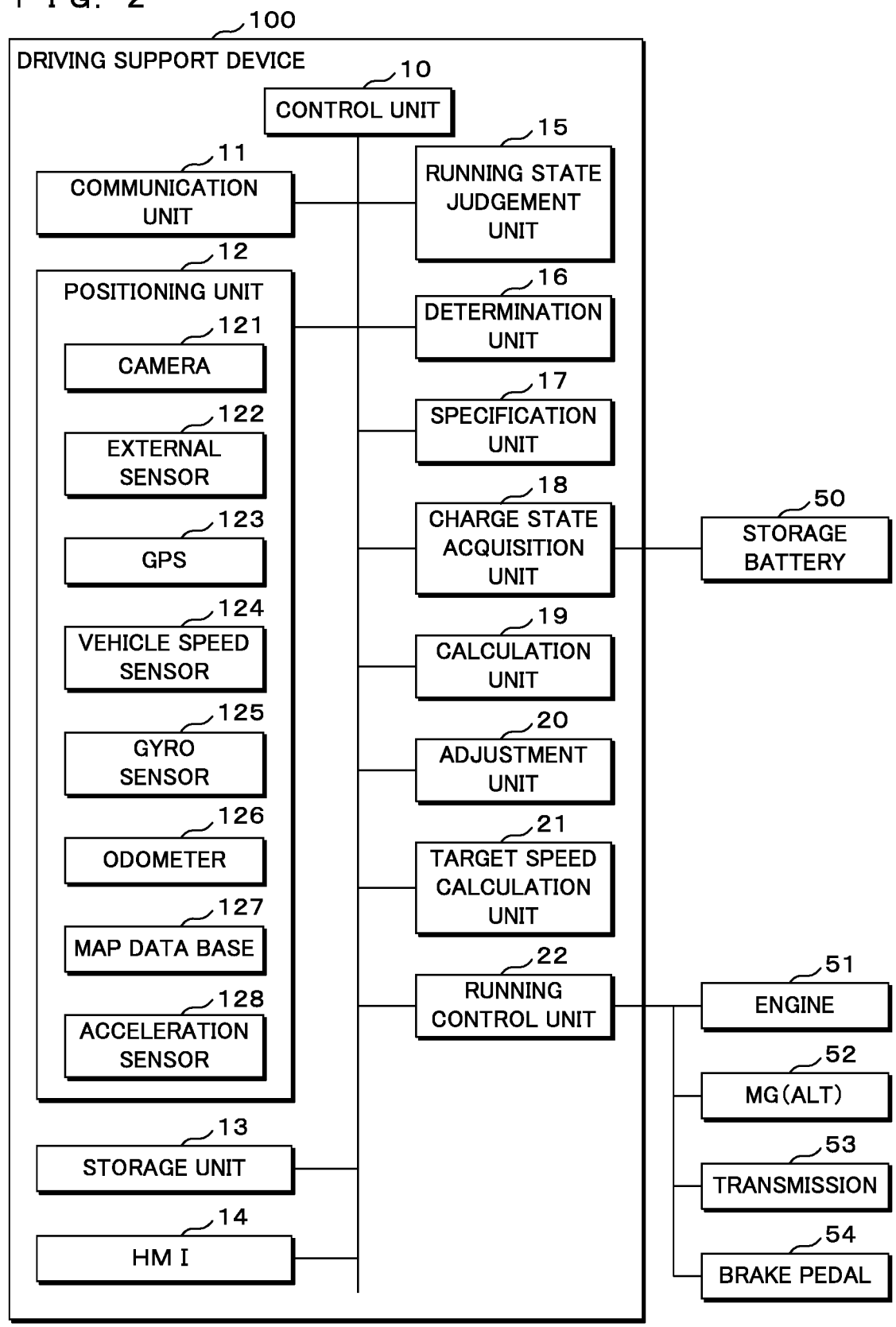
FIG. 2 A block diagram illustrating an example of the configuration of a driving support device of this embodiment.

FIG. 2 is a block diagram illustrating an example of the configuration of a driving support device 100 of this embodiment. The driving support device 100 is provided with a control unit 10 for controlling the entire device, a communication unit 11, a positioning unit 12, a storage unit 13, an HMI (Human Machine Interface) 14, a running state judgement unit 15, a determination unit 16, a specification unit 17, a charge state acquisition unit 18, a calculation unit 19, an adjustment unit 20, a target speed calculation unit 21, a running control unit 22, and the like. The positioning unit 12 is provided with a camera 121, an external sensor 122, a GPS 123, a vehicle speed sensor 124, a gyro sensor 125, an odometer 126, a map database 127, an acceleration sensor 128 and the like.

The vehicle (subject vehicle) is provided with a storage battery 50, an engine 51, an MG (ALT) 52 (motor generator, alternator), a transmission 53, a brake pedal 54 and the like.

The control unit 10 has a timer built therein, and may be constituted of an exclusive hardware circuit or may be constructed to execute a computer program in which process procedures are preset.

The communication unit 11 has a communication function to make road-to-vehicle communication with the optical beacon 200. It is to be noted that the communication unit 11 is not limited to short range communication such as an optical beacon, a radio beacon or DSRC, and may be provided with a wireless LAN function such as the UHF band or the VHF band as middle range communication or may be provided with a communication function such as a portable telephone, a PHS, multiplex FM broadcasting or the Internet communication as wide range communication. The communication unit 11 is also provided with a reception function to receive a signal transmitted from the on-road devices 301 and 302. It is to be noted that the on-road devices are only required to output a signal to be used for measurement and are not necessarily intended for communication, and the communication unit 11 is to receive a signal in order to detect that the signal is to be used therefor.

The positioning unit 12 receives radio waves from a plurality of GPS satellites at the GPS 123, and momently performs positioning of the vehicle. The positioning unit 12 also estimates the vehicle position on the basis of signals outputted from the vehicle speed sensor 124 and the gyro sensor 125 in order to narrow an area to which radio waves from GPS satellites do not reach or to reduce an error in positioning by the GPS 123, and further compares information, which has been acquired by the external sensor 122 such as a camera 121 or a radar, with the map database 127 so as to achieve further accurate positioning of the vehicle. It is also possible to measure the running distance using the odometer 126. It is to be noted that a quasi-zenith satellite system or a DGPS (Differential GPS) may be mounted in addition to the GPS 123. The DGPS can receive FM broadcasting or a medium wave outputted from a reference station whose position has already been found and correct a displacement of the position calculated by the GPS, and therefore can improve the accuracy in measurement of the position of the subject vehicle.

The camera 121 is placed at a front grille, a front bumper or the like of the vehicle, for example, so as to image a road ahead of the vehicle. The external sensor 122 includes an infrared camera, a millimeter wave camera, a laser radar, an ultrasonic sensor or the like, for example, and can detect whether another vehicle or the like exists around, e.g. ahead or behind, the vehicle or not.

The HMI 14 is provided with a display unit, a speaker, an operation unit and the like, and functions as a user interface between the driver and the driving support device 100. The HMI 14 can also provide an application including a navigation function.

The running control unit 22 accelerates or decelerates the vehicle at a required acceleration or deceleration.

The storage unit 13 stores predetermined information received through the communication unit 11.

Figure 3:
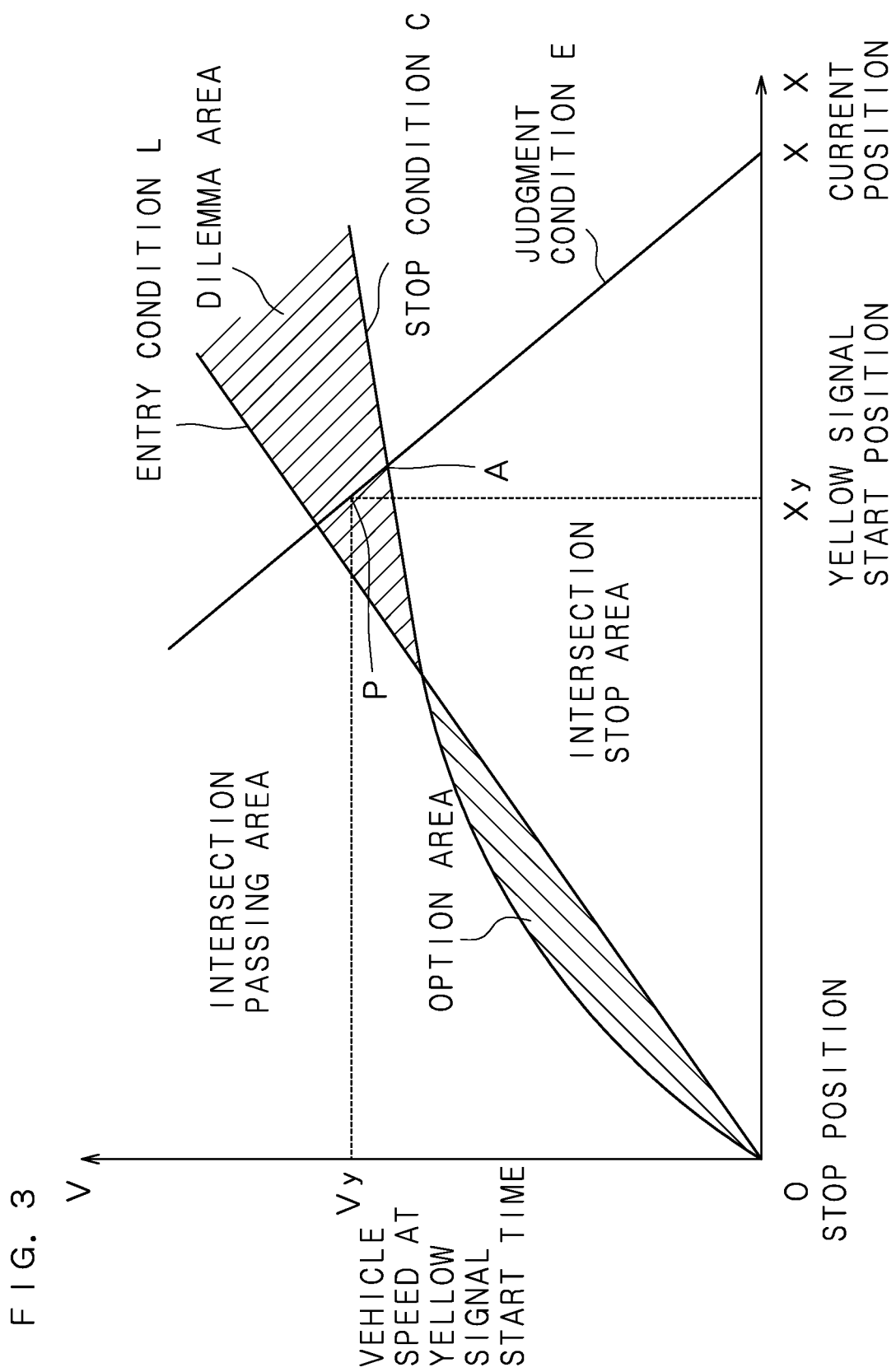
FIG. 3 An explanatory drawing illustrating an outline of a dangerous running area of this embodiment.

FIG. 3 is an explanatory drawing illustrating an outline of a dangerous running area of this embodiment. In the figure, the abscissa axis represents distance from a stop position while the ordinate axis represents speed of the vehicle. A dangerous running area is an area where a dangerous running state determined by a stop condition for causing the vehicle to stop in front of an intersection and an entry condition for causing the vehicle to enter an intersection can be represented by the speed of the vehicle and the distance to the stop position. A dangerous running area includes a dilemma area and an option area. A dilemma area is a state where the vehicle tries to stop after a yellow signal is displayed but cannot stop in front of the intersection and cannot enter the intersection before a yellow signal end time point, and is a state where the vehicle cannot stop or enter the intersection safely. On the other hand, an option area is a state where the vehicle tries to stop after a yellow signal is displayed and can stop in front of the intersection and can enter the intersection before a yellow signal end time point, and is an unstable state where whether the vehicle stops or enters the intersection differs depending on the characteristic of the driver.

In FIG. 3, a current position of the vehicle based on the stop position is denoted by X, a current speed is denoted by V, and a time period until a yellow signal starts is denoted by t (0<t<signal cycle). The position Xy of the vehicle at the yellow signal start time is calculated by a formula (1), assuming that the acceleration of the vehicle does not change. The formula (1) is a judgment condition E based on the current running state of the vehicle.

$$X - Xy = V \cdot t + \frac{1}{2}(V - Vy) \cdot t \quad (1)$$

$$V^2 \leq 2g(Xy - \alpha \cdot V) \quad (2)$$

$$V \cdot Ty \geq Xy \quad (3)$$

On the other hand, a stop condition C for causing the vehicle to safely stop in front of an intersection and wait for a signal is calculated by the formula (2). Here, g denotes a standard deceleration of the vehicle, and a denotes a time delay (time delay of brake) from when the signal changes to yellow to when the driver steps on the brake. That is, the stop condition C is a curve representing the limitation of the distance to the stop position and the speed of the vehicle with which the vehicle can stop if the vehicle decelerates at a standard deceleration when a yellow signal starts.

An entry condition L for causing the vehicle to enter the intersection at a yellow signal end time point and allowing the vehicle to avoid waiting for a signal is calculated by the formula (3). Here, Ty denotes a yellow signal time period. That is, the entry condition L is a straight line representing the limitation of the distance to the stop position and the speed of the vehicle with which the vehicle can reach the intersection within the yellow signal time period (before the signal changes to red) if the signal changes to yellow while the vehicle is running.

A dilemma area is an area where neither the formula (2) nor the formula (3) is satisfied, while an option area is an area where both of the formulas (2) and (3) are satisfied. It is to be noted that a lower area of the dangerous running area in the figure is an intersection stop area where the vehicle can safely stop at a stop position such as a position in front of a stop line. On the other hand, an upper area of the dangerous running area is an intersection passing area where the vehicle can safely enter (pass through) the intersection.

If there is a possibility that the vehicle runs into a dangerous running area (dilemma area and option area) at the yellow signal start time point, that is, if the state quantity (position Xy and speed Vy at point P in FIG. 3) of the vehicle is within the dangerous running area as illustrated in FIG. 3, the driving support device 100 determines whether to cause the vehicle to accelerate and pass through the intersection or to decelerate and stop at the intersection, in order to avoid getting into the dangerous running area. The driving support device 100 will now be described in detail.

The vehicle speed sensor 124 has a function as a speed acquisition unit, and acquires speed information (speed) of the vehicle.

The communication unit 11 receives signal information of a traffic signal located at an intersection. The communication unit 11 also has a function as a distance information acquisition unit, and acquires information on the distance between the vehicle and the intersection. Information on the distance between the vehicle and the intersection may be the distance between the vehicle and the intersection, or may be positions of the vehicle and the intersection.

The running state judgment unit 15 judges a dangerous running state to be determined by a stop condition for causing the vehicle to stop in front of the intersection and an entry condition for causing the vehicle to enter the intersection, on the basis of the distance to the intersection, the speed of the vehicle, and signal information (including signal parameters such as a yellow signal start time point or a yellow signal time period, for example).

If the running state judgment unit 15 judges that the vehicle is in a dangerous running state, the determination unit 16 determines whether to cause the vehicle to stop at the intersection or to pass through the intersection. Whether to cause the vehicle to stop at the intersection or to pass through the intersection can be determined by choosing the easier way to avoid the dangerous running state, for example.

Depending on the result of determination by the determination unit 16, the specification unit 17 specifies a regeneration time zone when running accompanied with regenerative braking is performed or an inertia time zone when inertia running is performed before the vehicle arrives at the intersection. In running accompanied with regenerative braking, a motor is utilized as a generator at the time of deceleration, for example, so that electric energy generated at this time is applied to charging of a storage battery and electric power supply to electric equipment as regenerative energy. On the other hand, in inertia running, the engine and the transmission are disconnected, so that fuel consumption is suppressed.

That is, if it is determined to cause the vehicle to stop at the intersection, regenerative braking is prioritized when decelerating the vehicle and regenerative energy is used for charging of a storage battery, so that regenerative energy can be recovered without waste and fuel efficiency is improved. On the other hand, if it is determined to cause the vehicle to pass through the intersection, inertia running is performed when the speed of the vehicle reaches a speed with which the vehicle can safely pass through the intersection so that fuel consumption can be suppressed, and therefore it is possible to support fuel-efficient running.

The charge state acquisition unit 18 acquires the charge state of the storage battery 50 mounted on the vehicle. The charge state is also referred to as an SOC. The SOC is represented as a numerical value from 0 to 1, and indicates a chargeable range of the storage battery 50 on the basis of the upper limit and the lower limit.

The specification unit 17 specifies a regeneration time zone or an inertia time zone depending on the charge state acquired by the charge state acquisition unit 18. If the storage battery 50 is in a chargeable state (if the storage battery 50 is not in a full charge state, or if the charge state is not at the upper limit) when decelerating the vehicle, for example, the specification unit 17 specifies an inertia time zone, so that a regenerative brake is prioritized at the time of braking and regenerative energy can be recovered. On the other hand, if the charge state of the storage battery 50 is at the upper limit and the storage battery 50 is in a non-chargeable state, the specification unit 17 specifies an inertia time zone, so that inertia running is prioritized at the time of running and fuel consumption can be suppressed.

Next, a method of causing the vehicle to decelerate and stop at an intersection, and a method of causing the vehicle to accelerate and pass through an intersection in the case where the running state judgement unit 15 judges that the vehicle is in a dangerous running state will be described. First, a case of causing the vehicle to decelerate and stop at an intersection will be described.

Figure 4:
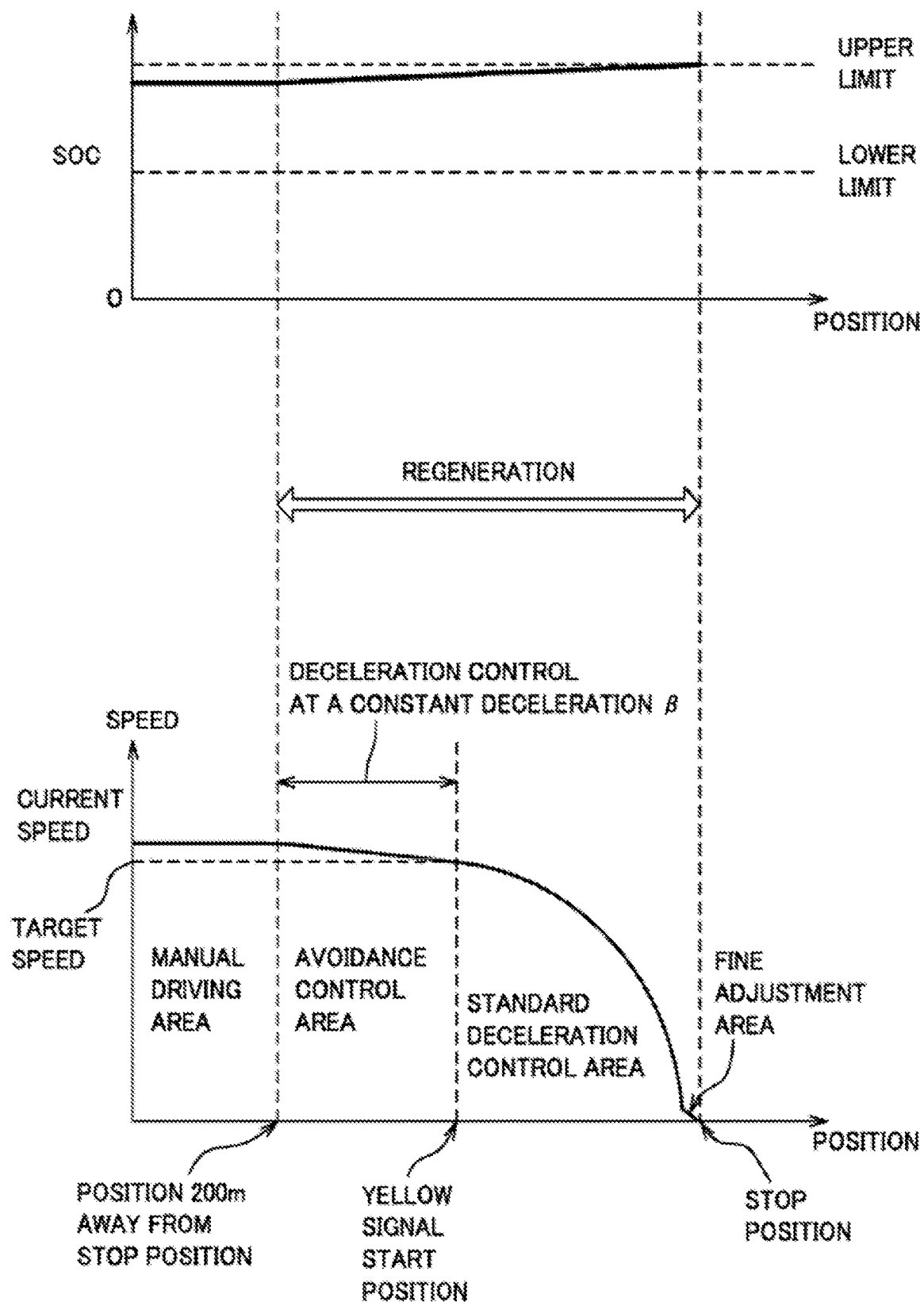
FIG. 4 An explanatory drawing illustrating First Embodiment of running control of the case where a driving support device of this embodiment causes a vehicle to stop at an intersection.

FIG. 4 is an explanatory drawing illustrating First Embodiment of running control of the case where the driving support device 100 of this embodiment causes the vehicle to stop at the intersection. In FIG. 4, the upper section shows the state of charge (SOC) of the storage battery 50 and the distance from the vehicle to the stop position, while the lower section shows a relation between the distance from the vehicle to the stop position and the speed. An area in front of a position 200 m away from the stop position is a manual driving area where the driver performs manual driving. At the position 200 m away from the stop position, the driving support device 100 judges a dangerous running state of the vehicle, and performs automatic driving control. It is to be noted that the timing for starting automatic driving is not limited to this.

If it is judged that the vehicle is in a dangerous running state, automatic speed control by the driving support device 100 starts from this point (a position 200 m away from the stop position), and the vehicle first runs into an avoidance control area where control for avoiding a dangerous running area is performed. The driving support device 100 performs deceleration control at a constant deceleration from a position 200 m away from the stop position to a yellow signal start position (time) (while the vehicle is in the avoidance control area). For example, the vehicle can decelerate at a constant deceleration δ from the current speed V so that the speed reaches a target speed Vs on the stop condition C after a time period t to a yellow signal start time point.

The target speed Vs is a speed to which the vehicle is decelerated so as to avoid (escape from) the dangerous running area. The target speed Vs can be calculated in the following manner. First, the speed Vs calculated on the basis of a current running state of the vehicle is treated as a target speed in the above formulas (1) and (2) if it is judged that the vehicle is running into a dilemma area. The target speed Vs is calculated as a speed at the point A in FIG. 3, and is represented by a formula (4).

$$Vs = \frac{1}{2}\left\{-g \cdot (3t + 2\alpha) + \sqrt{(g^2 \cdot (3t + 2\alpha)^2 + 4g(2X + Vy \cdot t))}\right\} \quad (4)$$

$$Vs = \left(X + \frac{1}{2} \cdot Vy \cdot t\right) / \left(Ty + \frac{3}{2}t\right) \quad (5)$$

On the other hand, if it is judged that the vehicle is running into an option area, the lower limit of the speed Vs calculated on the basis of a current running state of the vehicle is treated as a target speed in the above formulas (1) and (3). The target speed Vs is represented by the formula (5).

An area lying ahead of the yellow signal start position (time point) in automatic speed control is a standard deceleration control area where the vehicle is controlled to decelerate at a standard deceleration. That is, the driving support device 100 performs deceleration control at a standard deceleration from the yellow signal start time point (yellow signal start position). If the camera 121 detects a stop line or a stop vehicle, an area lying ahead of the position becomes a fine adjustment area where the speed is controlled by fine adjustment control while correcting the stop position, depending on the road condition around the stop position. Fine adjustment control is to momently detect the stop position, calculate the distance to the stop position, and gradually change the speed on the basis of the distance to the stop position.

If the determination unit 16 determines to cause the vehicle to stop at the intersection, the calculation unit 19 calculates regenerative energy which can be recovered before the vehicle stops. Recoverable regenerative energy Eg can be found by a formula of Eg=(S−R)×e, wherein the kinetic energy of the vehicle is denoted by S, energy required for running of the vehicle before the vehicle stops at the intersection is denoted by R, and the power generation efficiency of a generator or an alternator is denoted by e. The kinetic energy S of the vehicle is calculated from the vehicle weight and the speed. R denotes work done by running resistance composed of air resistance, tire rolling resistance, slope resistance and acceleration resistance. The air resistance is represented as $k \times V^2$, the tire rolling resistance is represented as $\mu \times M \times G \times \cos \theta$, the slope resistance is represented as $M \times G \times \sin \theta$, and the acceleration resistance is represented as $M \times a$. Here, k denotes an air resistance coefficient, μ denotes a rolling resistance coefficient, M denotes vehicle weight, G denotes a gravitational acceleration, and θ denotes a tilt angle of the road surface. It is to be noted that the tilt angle of the road surface may be acquired from the map database 127, the vehicle weight, the air resistance coefficient and the gravitational acceleration may be preliminarily stored in the storage unit 13, and the rolling resistance coefficient may be estimated utilizing a tire pressure sensor or the like. The vehicle weight may be corrected utilizing a seat sensor, a fuel meter or the like. The vehicle speed is acquired using the vehicle speed sensor 124, and the vehicle acceleration is acquired using the acceleration sensor 128.

If regenerative energy calculated by the calculation unit 19 is larger than charging energy required for putting the storage battery 50 into a full charge state, the specification unit 17 specifies a regeneration time zone or an inertia time zone so that the storage battery 50 is put into a full charge state when the vehicle stops at the intersection. By combining running accompanied with regenerative braking and inertia running so that the storage battery 50 is put into a full charge state when the vehicle stops, it becomes possible to recover regenerative energy without waste while suppressing fuel consumption and increasing running distance.

If the determination unit 16 determines to cause the vehicle to stop at the intersection and the vehicle performs running accompanied with regenerative braking, the adjustment unit 20 adjusts the regenerative power generation amount so that the storage battery 50 is put into a full charge state when the vehicle stops at the intersection. The regenerative power generation amount is adjusted to be (Wp+Wc), wherein charging energy required for putting the storage battery 50 into a full charge state is denoted by Wp and a power consumption amount (e.g., a power consumption amount of electric equipment) required before the vehicle stops is denoted by Wc. Adjustment of a regenerative power generation amount may be achieved by adjusting exciting current of the MG (ALT) 52.

In the example of FIG. 4, the specification unit 17 specifies a time zone from a time point when the vehicle is at a position 200 m away from the stop position to a time point when the vehicle stops as a regeneration time zone. In this time zone, the vehicle performs running (deceleration running) accompanied with regenerative braking. At the time point when the vehicle stops, the SOC is at the upper limit and the storage battery 50 is in a full charge state. Since the storage battery 50 can be put into a full charge state as described above, regenerative energy can be recovered without waste.

Figure 5:
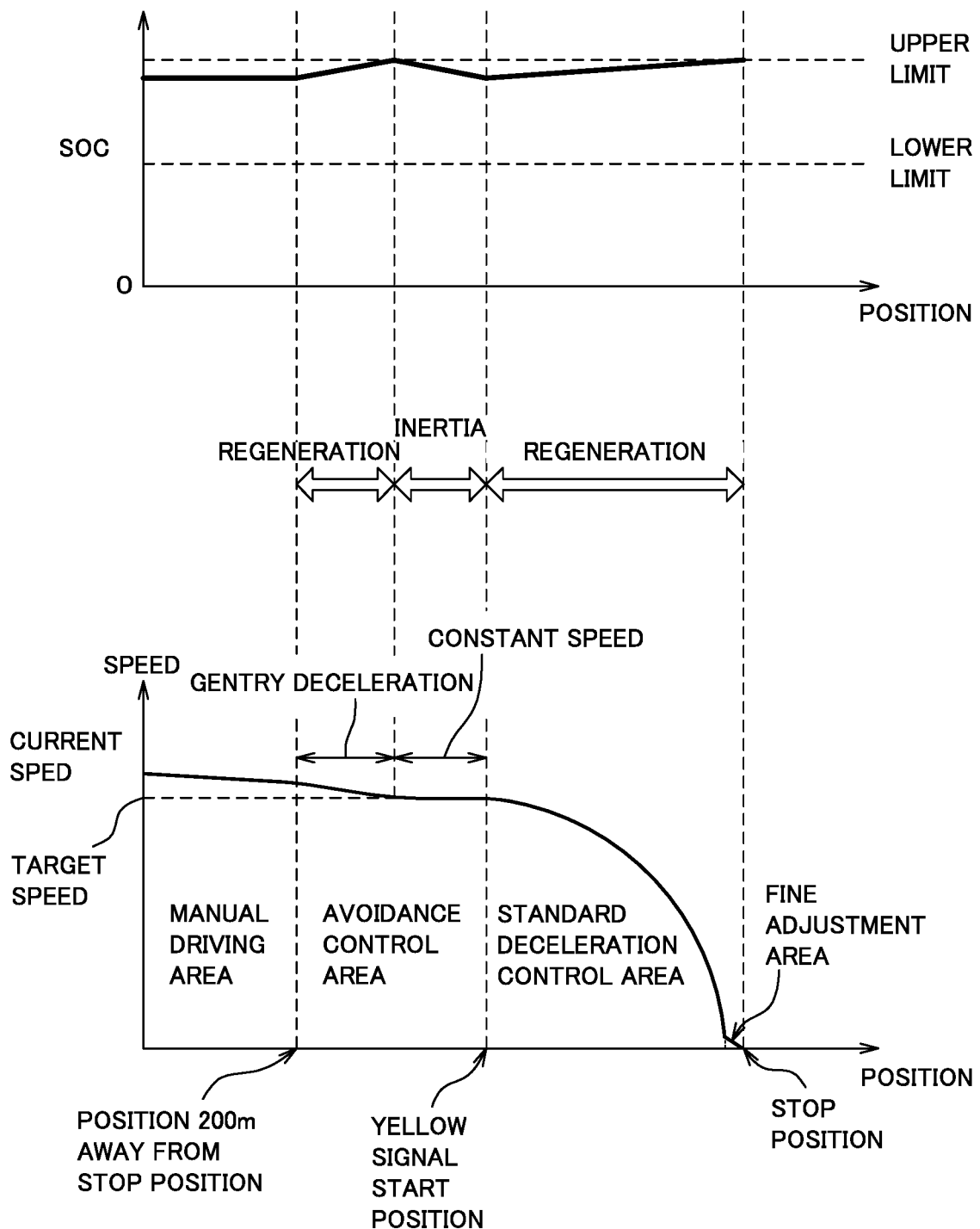
FIG. 5 An explanatory drawing illustrating Second Embodiment of running control of the case where a driving support device of this embodiment causes a vehicle to stop at an intersection.

FIG. 5 is an explanatory drawing illustrating Second Embodiment of running control of the case where the driving support device 100 of this embodiment causes the vehicle to stop at the intersection. In Second Embodiment, the driving support device 100 performs deceleration control at a gentle deceleration in an avoidance control area so that the speed of the vehicle reaches a target speed Vs which satisfies the stop condition C. After the speed of the vehicle reaches the target speed Vs, the speed is maintained and constant speed control is performed until a yellow signal start time point.

As illustrated in FIG. 5, the specification unit 17 specifies a regeneration time zone and performs running accompanied with regenerative braking while the vehicle is gently decelerating in the avoidance control area. The specification unit 17 specifies an inertia time zone and performs inertia running while the vehicle is running at a constant speed in the avoidance control area. The specification unit 17 specifies a regeneration time zone and performs running accompanied with regenerative braking while the vehicle is decelerating at a standard deceleration in a standard deceleration control area.

If the charge state acquisition unit 18 acquires a charging stop state, the specification unit 17 specifies an inertia time zone from the time point of acquisition. A charging stop state is, for example, a state where the SOC (state of charge) is at the upper limit and the storage battery 50 is in a full charge state, and can be a state where charging cannot be performed any more. In the example of FIG. 5, the vehicle is gently decelerated at a position 200 m away from the stop position so as to recover regenerative energy, and the storage battery 50 is charged using the recovered regenerative energy. By switching to inertia running when the storage battery 50 is put into a full charge state as a result, running distance is increased and fuel efficiency is improved. It is to be noted that the timing for switching from running accompanied with regenerative braking to inertia running may be found on the basis of the charge state of the storage battery 50, a difference between a current speed of the vehicle and the target speed Vs, or the like, for example.

By causing the vehicle to perform inertia running, recovery of regenerative energy is not performed, and the SOC of the storage battery 50 gradually lowers. After passing a yellow signal start position, the vehicle is controlled to decelerate at a standard deceleration, and regenerative energy is recovered as illustrated in FIG. 5. In such a case, the regenerative power generation amount is also adjusted so that the storage battery 50 is put into a full charge state when the vehicle stops at the intersection.

If the charge state acquisition unit 18 acquires a charging start state, the specification unit 17 can specify a regeneration time zone from the time point of acquisition. A charging start state is, for example, a state where the SOC (state of charge) is not at the upper limit and the storage battery 50 is in a chargeable state, and is a state where charging is to be started.

If the charge state of the storage battery 50 is not at the upper limit and the storage battery 50 is in a chargeable state in the case where the vehicle performs inertia running, regenerative energy can be recovered without waste by switching to running accompanied with regenerative braking and charging the storage battery 50 using regenerative energy.

If the SOC of the storage battery 50 reaches the lower limit in the case where the vehicle is performing inertia running in the example of FIG. 5, for example, the vehicle may perform running accompanied with regenerative braking, that is, the vehicle may decelerate at a standard deceleration from the time point when the SOC reaches the lower limit, though it is not illustrated in FIG. 5.

Figure 6:
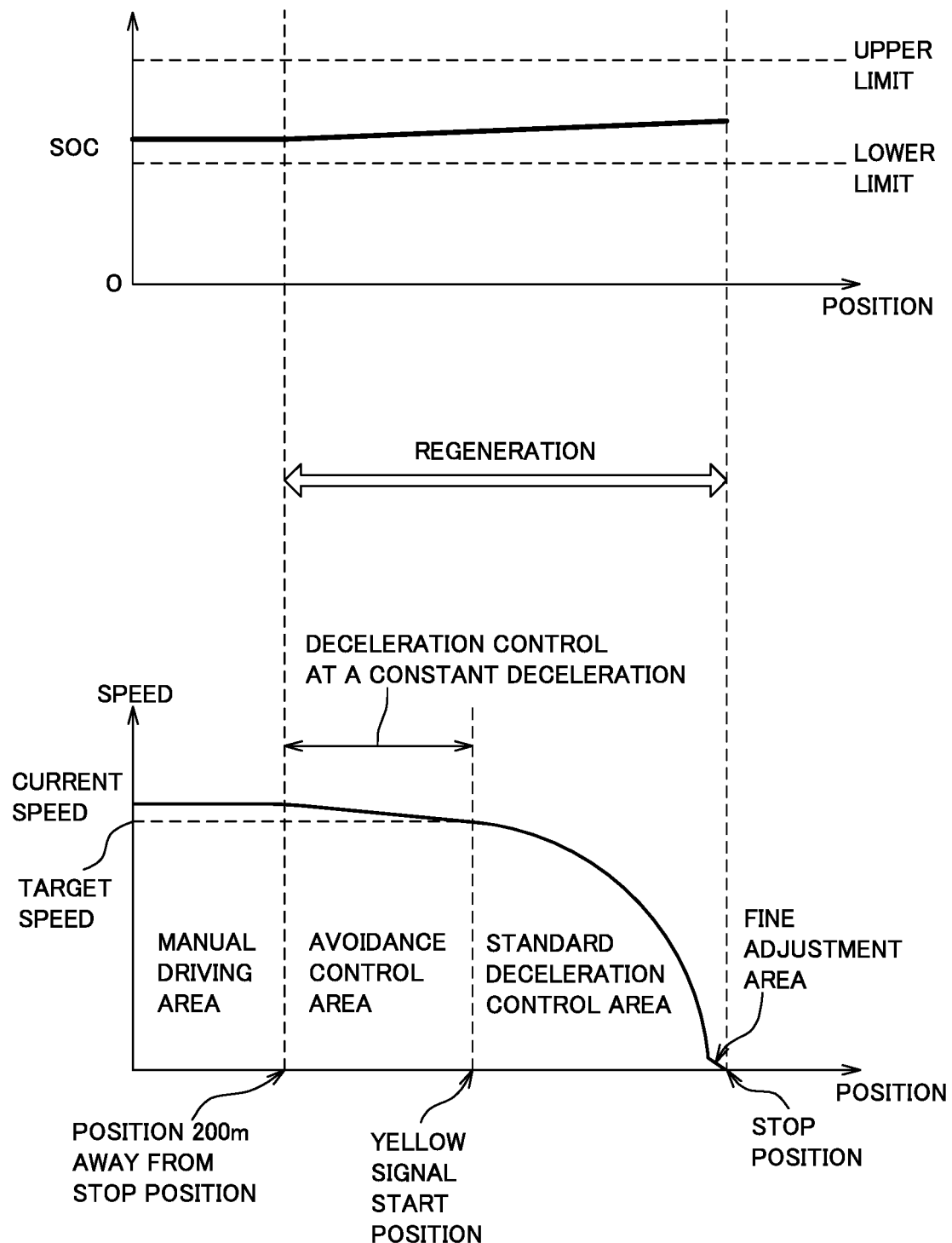
FIG. 6 An explanatory drawing illustrating Third Embodiment of running control of the case where a driving support device of this embodiment causes a vehicle to stop at an intersection.

FIG. 6 is an explanatory drawing illustrating Third Embodiment of running control of the case where the driving support device 100 of this embodiment causes the vehicle to stop at the intersection. Third Embodiment illustrates the case where regenerative energy calculated by the calculation unit 19 is smaller than charging energy required for putting the storage battery 50 into a full charge state. That is, the specification unit 17 specifies a regeneration time zone if regenerative energy calculated by the calculation unit 19 is smaller than charging energy required for putting the storage battery 50 into a full charge state. This makes it possible to allocate regenerative energy all to charging of the storage battery 50, and therefore regenerative energy can be all recovered.

Next, a method of causing a vehicle to accelerate and pass through the intersection if the running state judgement unit 15 judges that the vehicle is in a dangerous running state will be described.

Figure 7:
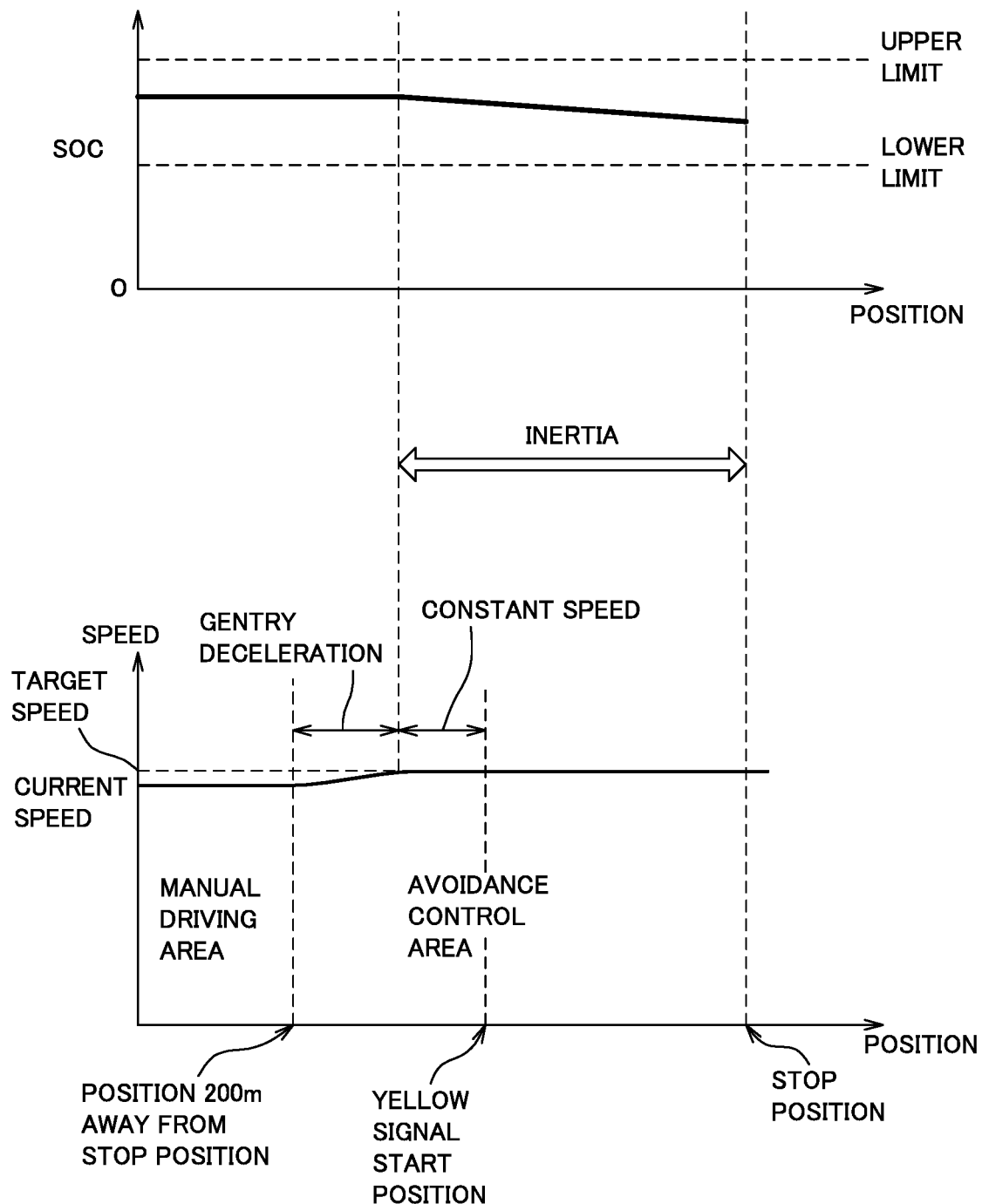
FIG. 7 An explanatory drawing illustrating an example of running control of the case where a driving support device of this embodiment causes a vehicle to pass through an intersection.
Figure 8:
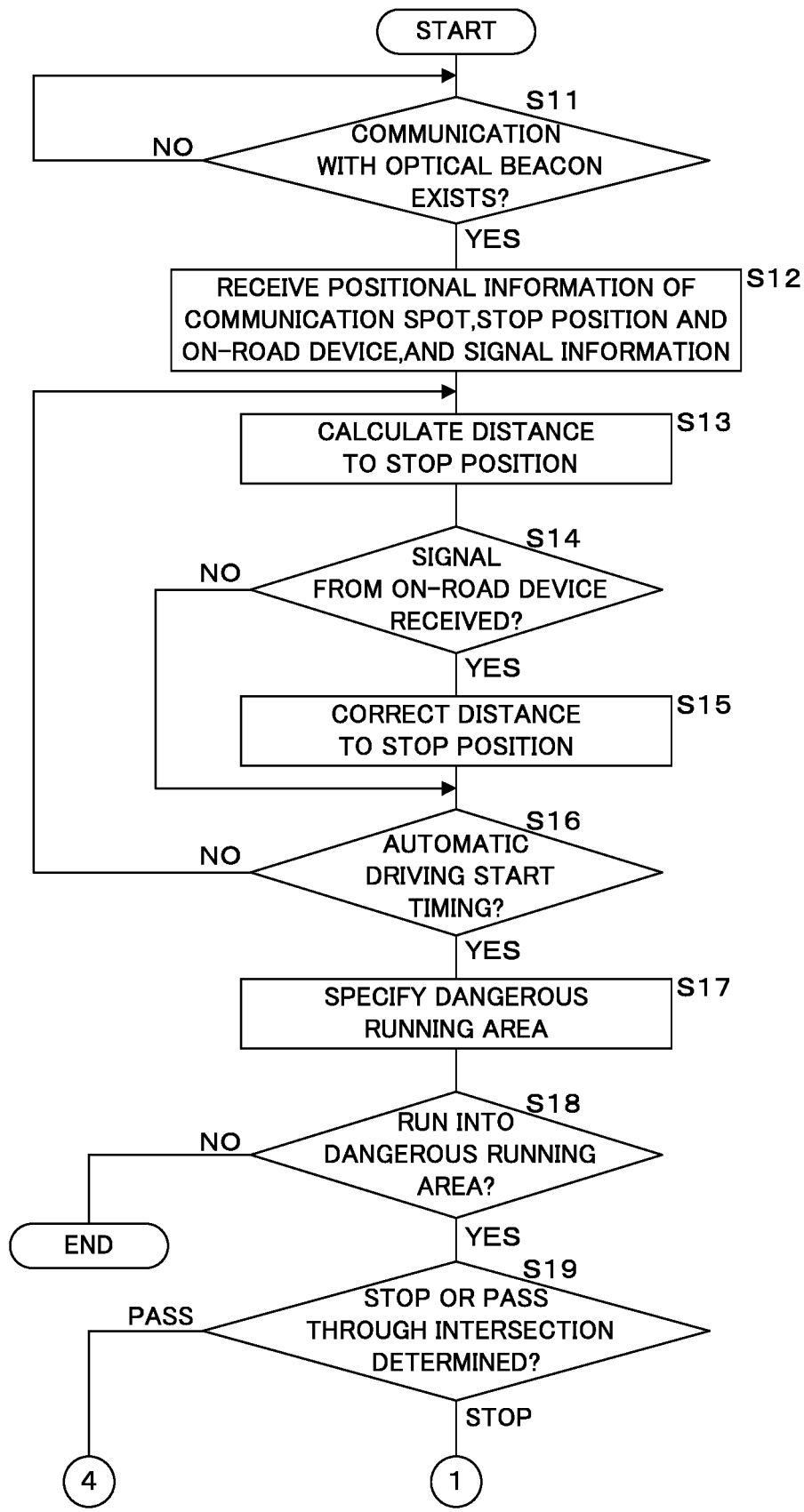
FIG. 8 A flowchart illustrating an example of process procedures by a driving support device of this embodiment.
Figure 9:
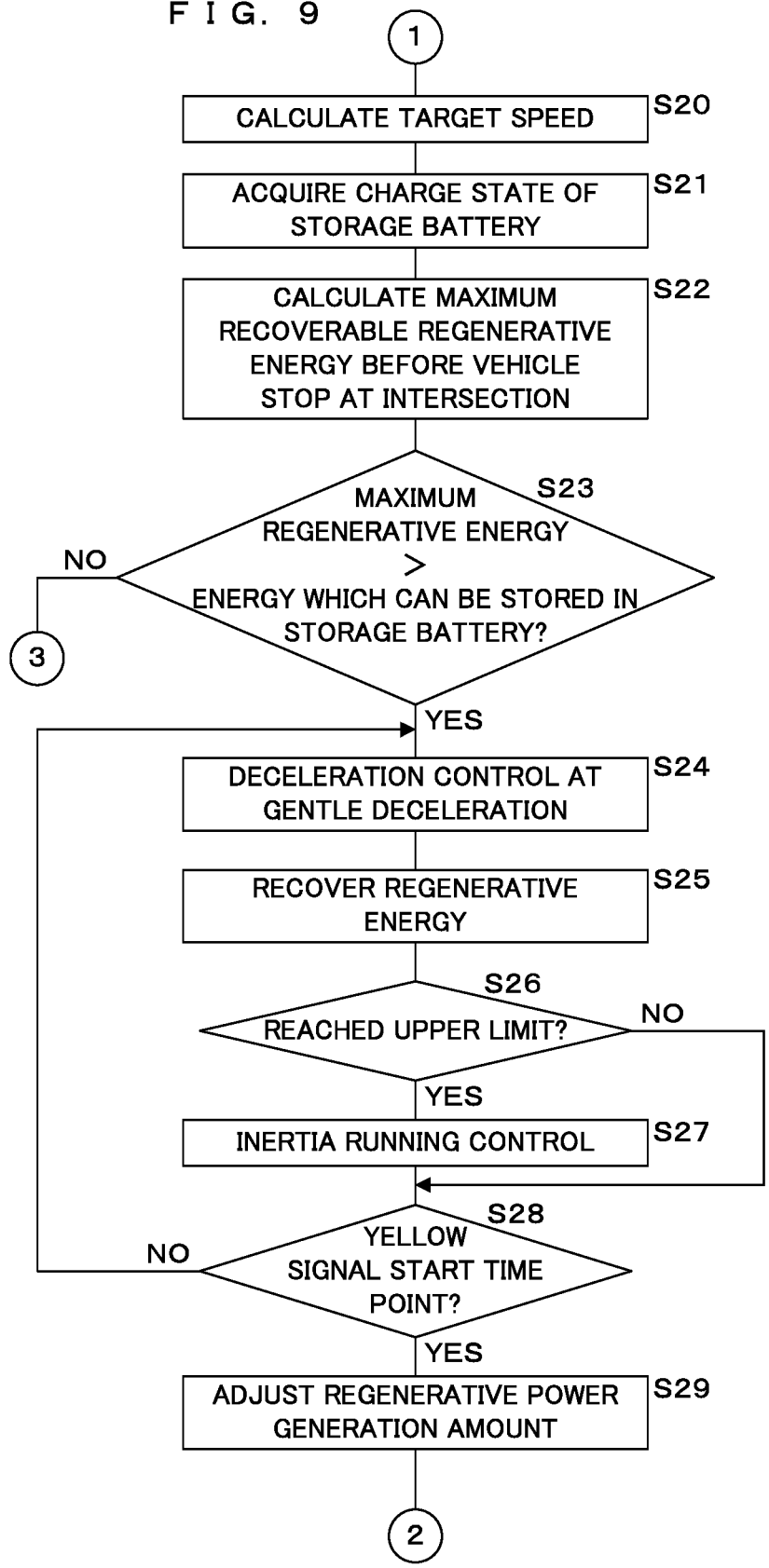
FIG. 9 A flowchart illustrating an example of process procedures by a driving support device of this embodiment.
Figure 10:
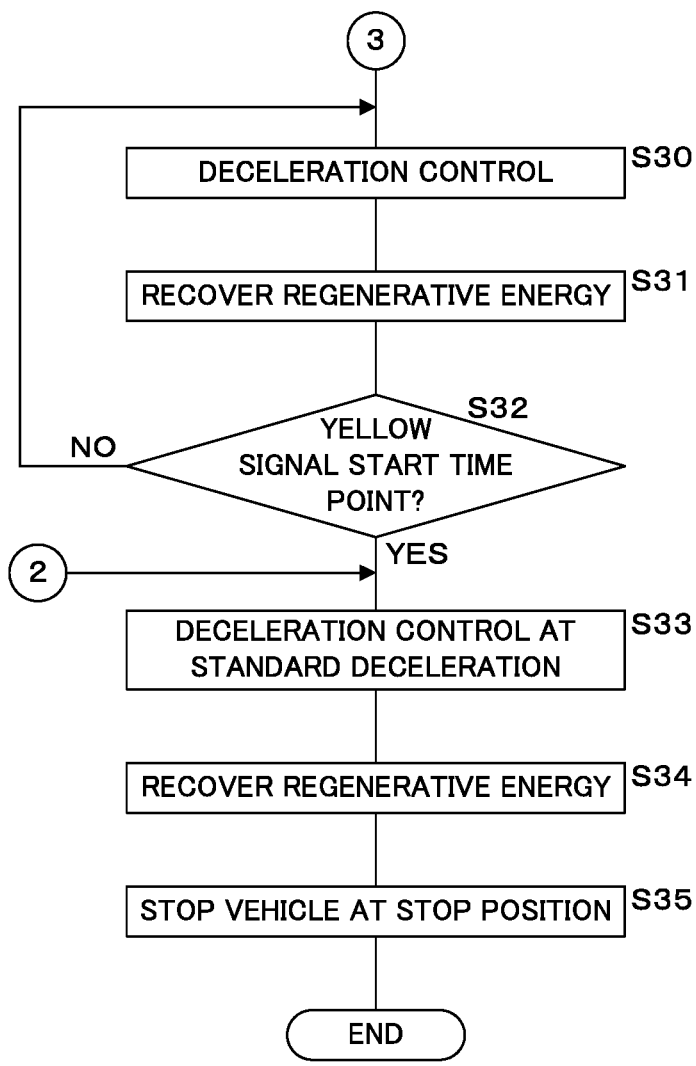
FIG. 10 A flowchart illustrating an example of process procedures by a driving support device of this embodiment.
Figure 11:
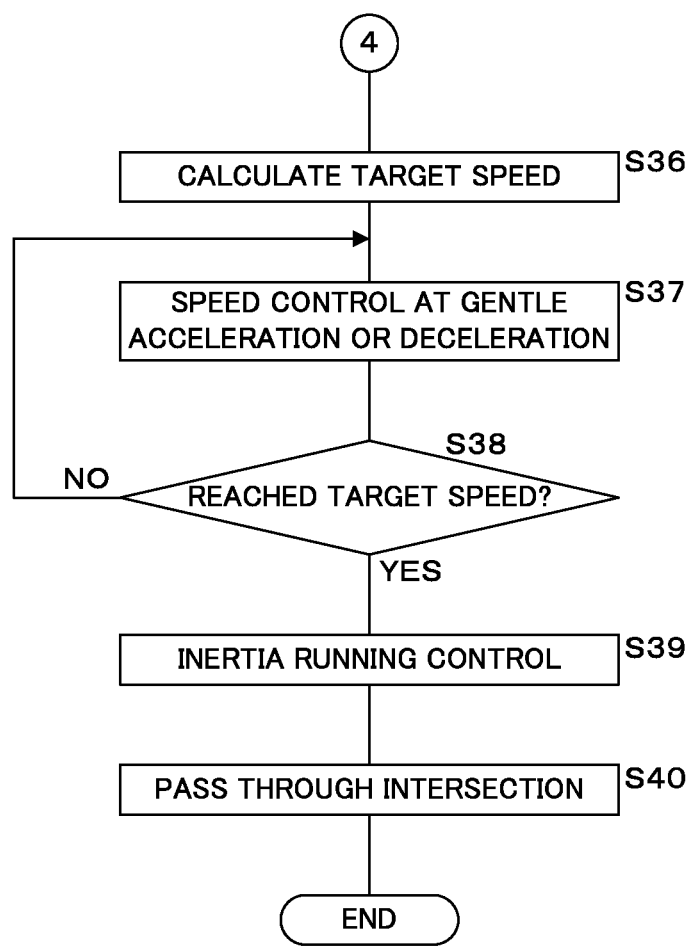
FIG. 11 A flowchart illustrating an example of process procedures by a driving support device of this embodiment.

FIG. 7 is an explanatory drawing illustrating an example of running control of the case where the driving support device 100 of this embodiment causes the vehicle to pass through the intersection. In FIG. 7, the upper section shows the state of charge (SOC) of the storage battery 50 and the distance from the vehicle to the stop position, while the lower section shows a relation between the distance from the vehicle to the stop position and the speed. An area in front of a position 200 m away from the stop position is a manual driving area where the driver performs manual driving. At the position 200 m away from the stop position, the driving support device 100 judges whether the vehicle is in a dangerous running state or not, and performs automatic driving control. It is to be noted that the timing for starting automatic driving is not limited to this.

If it is judged that the vehicle is in a dangerous running state, automatic speed control by the driving support device 100 starts from this point, and the vehicle runs into an avoidance control area where control for avoiding a dangerous running area is performed. If the dangerous running area is a dilemma area, the driving support device 100 performs acceleration control at a gentle acceleration so that the speed of the vehicle reaches a target speed which specifies the entry condition L. After the speed of the vehicle reaches the target speed, the speed is maintained and constant speed control is performed until a yellow signal start time point.

After the yellow signal start time point, the speed is still maintained and the vehicle passes through the intersection at a constant speed. It is to be noted that the driving support device 100 can finely adjust the speed while correcting the distance to the stop position after a time point when the camera 121 detects the stop line, and control the vehicle to enter (pass through) the intersection at a yellow signal end time point.

If the determination unit 16 determines to cause the vehicle to pass through the intersection, the specification unit 17 specifies an inertia time zone. Fuel consumption can be suppressed by causing the vehicle to perform inertia running and pass through the intersection, for example.

More specifically, the target speed calculation unit 21 calculates a target speed Vr which satisfies the entry condition L if the determination unit 16 determines to cause the vehicle to pass through the intersection. The target speed Vr is a speed with which the vehicle can safely pass through the intersection.

An acceleration a of the vehicle in inertia running and a speed V satisfy the following formula:

$$a=-(\mu \times M \times G \times \cos\theta + k \times V^2 + M \times G \times \sin\theta)/M$$

Here, n denotes a rolling resistance coefficient, M denotes vehicle weight, G denotes a gravitational acceleration, θ denotes a tilt angle of the road surface, and k denotes an air resistance coefficient. The target speed Vr corresponds to an initial value of the solution to the above differential equation, which describes a speed-position locus that satisfies the entry condition L in FIG. 3. It is to be noted that the tilt angle of the road surface may be acquired from the map database 127, the vehicle weight, the air resistance coefficient and the gravitational acceleration may be preliminarily stored in the storage unit 13, and the rolling resistance coefficient may be estimated utilizing a tire pressure sensor or the like. The vehicle weight may be corrected utilizing a seat sensor, a fuel meter or the like. The vehicle speed is acquired using the vehicle speed sensor 124, and the vehicle acceleration is acquired using the acceleration sensor 128.

The specification unit 17 specifies an inertia time zone from a time point when the vehicle accelerates and the speed of the vehicle reaches the target speed Vr, for example. In the example of FIG. 7, the vehicle is gently accelerated at a position 200 m away from the stop position, and is switched to inertia running at a time point when the speed of the vehicle reaches the target speed Vr which satisfies the entry condition L. That is, fuel consumption can be suppressed by performing inertia running after the vehicle is accelerated and the speed of the vehicle reaches the target speed Vr in the case of causing the vehicle to pass through the intersection.

It is to be noted that the MG (ALT) 52 may start power generation so as to charge the storage battery 50 if the SOC of the storage battery 50 reaches the lower limit during inertia running.

In the above case illustrated in FIGS. 4 to 7, the running control unit 22 controls the vehicle to perform running accompanied with regenerative braking or inertia running depending on a regeneration time zone or an inertia time zone specified by the specification unit 17. This makes it possible to make running control by switching between running accompanied with regenerative braking and inertia running.

Next, the operation of the driving support device 100 of this embodiment will be described. FIGS. 8 to 11 are a flow chart illustrating an example of process procedures by the driving support device 100 of this embodiment. The processing entity will be hereinafter described as the control unit 10 for convenience. The control unit 10 judges whether communication with the optical beacon 200 exists or not (S11) and, if communication does not exist (NO in S11), the control unit 10 continues the process of step S11 and waits until communication with the optical beacon 200 is made.

If communication with the optical beacon 200 exists (YES in S11), the control unit 10 receives positional information of a communication spot, a stop position and on-road devices, and signal information including a yellow signal start time point, a yellow signal time period and the like of a signal from the optical beacon 200 (S12). It is to be noted that the distance from the stop position to the communication spot, or the distance from the stop position to the on-road devices can also be acquired.

The control unit 10 calculates the distance to the stop position (S13) and judges whether a signal has been received from an on-road device 301 or 302, and, if a signal has been received (YES in S14), the control unit 10 corrects the distance to the stop position (S15). Assuming that the distance from the stop position to a communication spot for communication with an on-road device 301 or 302 is denoted by L, for example, the position of the vehicle is corrected to be at a distance L from the stop position. This makes it possible to reset a distance error which would accumulate as the vehicle runs toward the stop position, and improve the accuracy in measurement of the distance to the stop position. If a signal has not been received (NO in S14), the control unit 10 performs the process of step S16, which will be described later, without performing the process of step S15.

The control unit 10 judges whether it is automatic driving start timing or not (S16). Automatic driving start timing can be suitably set as a point at a predetermined distance (e.g., 200 m) from the stop position, a time point when a time period to switching to a yellow signal becomes a predetermined time period (e.g., 5 to 10 seconds), a time point of communication with the last on-road device 302, a time point of communication with the optical beacon 200, or the like. Automatic driving start timing can also be changed depending on the speed of the vehicle.

If it is automatic driving start timing (YES in S16), the control unit 10 specifies a dangerous running area (S17), and judges whether the vehicle is running into a dangerous running area or not (S18). If it is not automatic driving start timing (NO in S16), the control unit 10 continues processes from step S13.

If the vehicle is running into a dangerous running area (YES in S18), the control unit 10 judges whether the vehicle is to stop or pass through the intersection (S19). If the vehicle is not running into a dangerous running area (NO in S18), the control unit 10 terminates the processing.

When it is determined to cause the vehicle to stop at the intersection (STOP in S19), the control unit 10 calculates a target speed which satisfies the stop condition (S20), and acquires the charge state of the storage battery 50 (S21). The control unit 10 calculates maximum regenerative energy (regenerative energy) which can be recovered before the vehicle stops at the intersection (S22), and judges whether the maximum regenerative energy is larger than energy which can be stored in the storage battery 50 or not (S23).

If the maximum regenerative energy is larger than energy which can be stored in the storage battery 50 (YES in S23), the control unit 10 performs deceleration control at a gentle deceleration (S24). That is, the control unit 10 makes running control accompanied with regenerative braking. The control unit 10 recovers regenerative energy (S25), and charges the storage battery 50.

The control unit 10 judges whether the charge state of the storage battery 50 has reached the upper limit of an SOC or not (S26) and, if the charge state has reached the SOC upper limit (YES in S26), the control unit 10 switches from running control accompanied with regenerative braking to inertia running control (S27). If the charge state has not reached the SOC upper limit (NO in S26), the control unit 10 performs the process of step S28, which will be described later, without performing the process of step S27.

The control unit 10 judges whether it is a yellow signal start time point or not (S28). It is to be noted that a structure to judge whether a predetermined time period has passed from a yellow signal start time point or not may be employed instead of the structure to judge whether it is a yellow signal start time point or not. In such a case, the predetermined time period is a time delay (time delay of brake) until the driver sees the signal switch to yellow and steps on the brake, and is a value of approximately 0.5 seconds, for example.

If it is a yellow signal start time point (YES in S28), the control unit 10 adjusts the regenerative power generation amount (S29), and performs the process of step S33, which will be described later. If it is not a yellow signal start time point (NO in S28), the control unit 10 performs the process of step S24.

If the maximum regenerative energy is not larger than energy which can be stored in the storage battery 50 (NO in S23), the control unit 10 makes deceleration control (S30). That is, the control unit 10 makes running control accompanied with regenerative braking. The control unit 10 recovers regenerative energy (S31), and charges the storage battery 50.

The control unit 10 judges whether it is a yellow signal start time point or not (S32) and, if it is not a yellow signal start time point (NO in S32), the control unit 10 performs the process of step S30. If it is a yellow signal start time point (YES in S32), the control unit 10 makes deceleration control at a standard deceleration (S33). That is, the control unit 10 makes running control accompanied with regenerative braking. The control unit 10 recovers regenerative energy (S34), causes the vehicle to stop at the stop position (S35), and terminates the processing.

If it is determined to cause the vehicle to pass through the intersection (PASS in S19), the control unit 10 calculates a target speed which satisfies the entry condition (S36), and makes speed control at a gentle acceleration or deceleration (S37). The control unit 10 judges whether the speed of the vehicle has reached the target speed or not (S38) and, if the speed of the vehicle has not reached the target speed (NO in S38), the control unit 10 performs the process of step S37.

If the speed of the vehicle has reached the target speed (YES in S38), the control unit 10 makes inertia running control (S39), causes the vehicle to pass through the intersection (S40), and terminates the processing.

Figure 12:
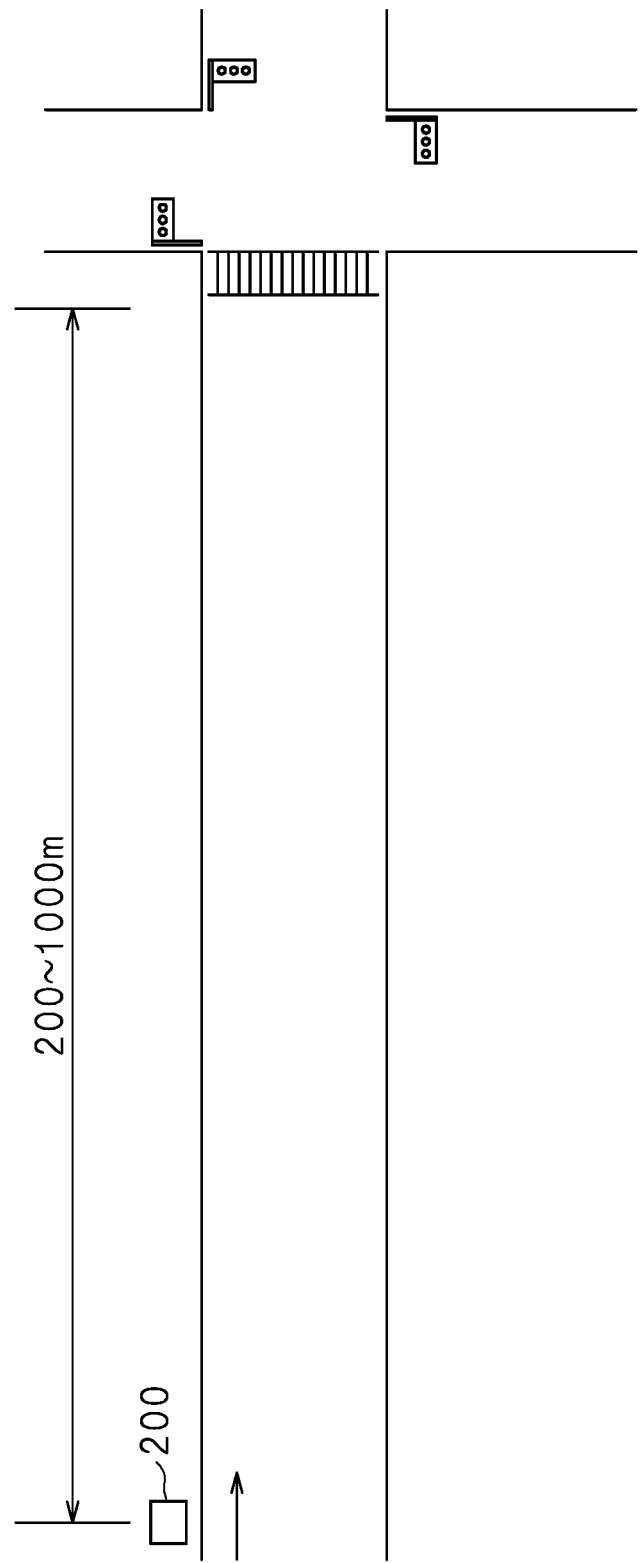
FIG. 12 A schematic view illustrating another example of an outline of a vehicle driving support system of this embodiment.

FIG. 12 is a schematic view illustrating another example of an outline of a vehicle driving support system of this embodiment. As illustrated in FIG. 12, only an optical beacon 200 can be located without locating the on-road devices 301 and 302. In such a case, the optical beacon 200 can be provided at a position approximately 200 to 1,000 m upstream away from the stop line. In such a case, a radio beacon, DSRC or the like can also be used instead of the optical beacon 200.

Figure 13:
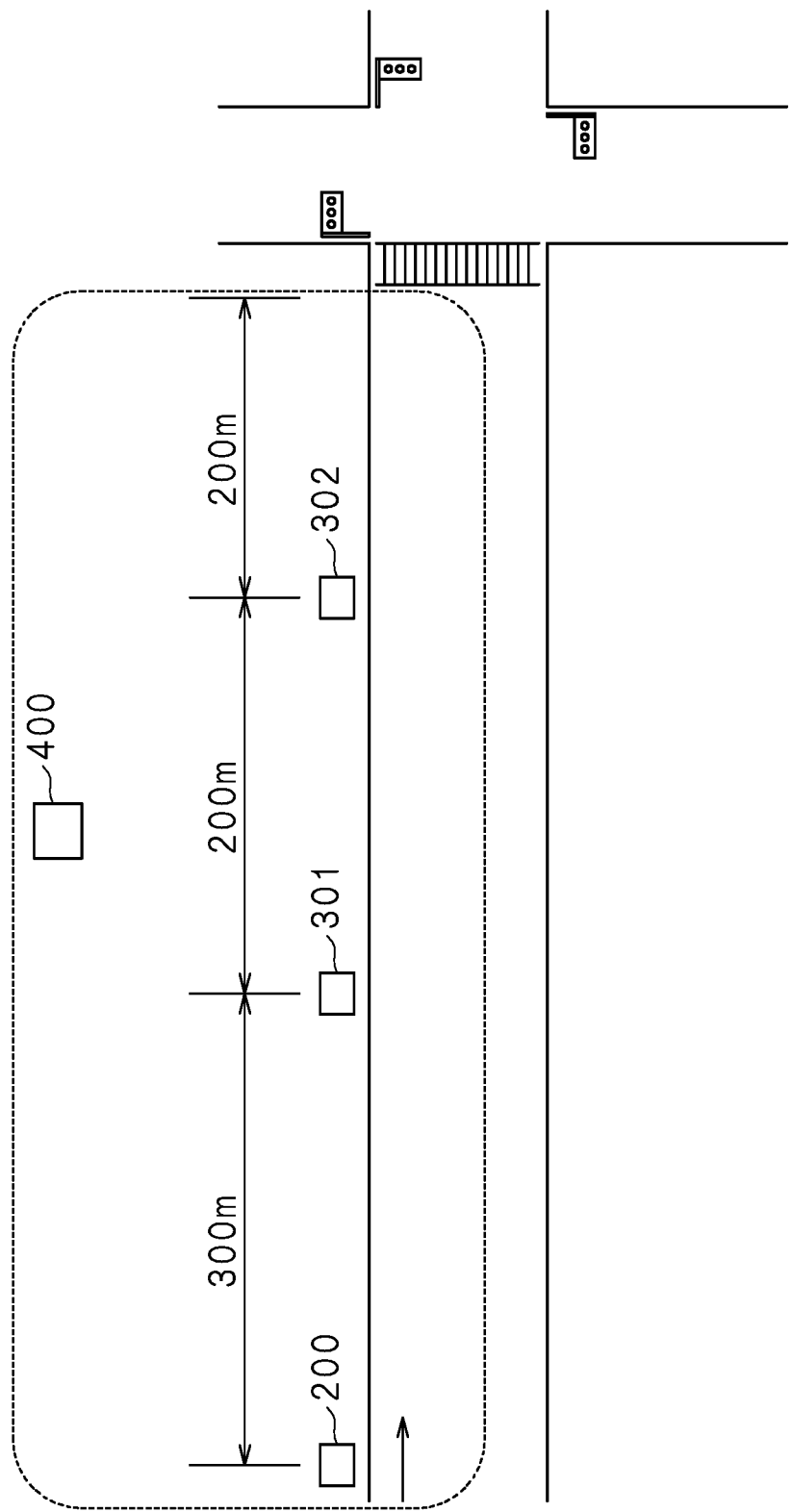
FIG. 13 A schematic view illustrating another example of an outline of a vehicle driving support system of this embodiment.

FIG. 13 is a schematic view illustrating another example of an outline of a vehicle driving support system of this embodiment. As illustrated in FIG. 13, a communication device 400 is provided in addition to the optical beacon 200 and the on-road devices 301 and 302. The communication device 400 is provided with a middle range communication function such as a wireless LAN, for example, and transmits signal information to a wide area. It is to be noted that the communication device 400 can be constituted of a device or the like which performs processing such as signal control, traffic information collection or traffic information dissemination. Moreover, the communication device 400 is not limited to middle range communication, and may also be a device provided with a wide range communication function such as FM broadcasting, a portable telephone or the Internet communication.

A driving support device 100 of this embodiment can also be implemented using a general-purpose computer provided with a CPU (processor), a RAM and the like. That is, the driving support device 100 can be implemented on a computer by loading a computer program, in which the process procedures illustrated in FIGS. 8 to 11 are set, into a RAM provided in the computer and executing the computer program at a CPU (processor).

Although the above embodiment has a structure wherein the running control unit 22 automatically controls running accompanied with regenerative braking and inertia running, the present invention is not limited to such a structure and may be constructed to give the driver an instruction on the timing for performing running accompanied with regenerative braking or inertia running, a target speed, or the like, for example, so that the driver drives the vehicle on the basis of the instruction.

The embodiments disclosed herein should be considered illustrative in all aspects and not restrictive. The scope of the present invention is defined not by the above description but by the appended claims, and is intended to include meanings equivalent to the claims and all changes within the scope. It is to be noted that, as used herein and in the appended claims, the singular forms "a", "an", and "the" include plural referents unless the context clearly dictates otherwise.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A driving support device for receiving signal information of a traffic signal located at an intersection and supporting driving of a vehicle, comprising:
   a non-transitory computer readable memory;
   a hardware processor coupled to the non-transitory computer readable memory and configured to read instructions from the non-transitory computer readable memory to cause the driving support device to perform operations comprising:
   acquiring speed information of the vehicle;
   acquiring information on a distance between the vehicle and the intersection;
   judging a dangerous running state to be determined by a stop condition for causing the vehicle to stop in front of the intersection and an entry condition for causing the vehicle to enter the intersection, on the basis of the distance to the intersection, the speed of the vehicle, and the signal information;
   determining whether to cause the vehicle to stop at the intersection or to pass through the intersection if it is judged that the vehicle is in the dangerous running state;
   acquiring a charge state of a storage battery mounted on the vehicle; and
   specifying a regeneration time zone when running accompanied with regenerative braking is performed or an inertia time zone when inertia running is performed, before the vehicle arrives at the intersection, depending on a result of the determining operation, wherein the specifying operation comprises specifying the regeneration time zone or the inertia time zone depending on the charge state.

2. The driving support device according to claim 1, wherein the operations further comprise calculating regenerative energy recoverable before the vehicle stops, if it is determined that the vehicle is caused to stop at the intersection, wherein the specifying operation comprises specifying the regeneration time zone or the inertia time zone so that the storage battery is put into a full charge state when the vehicle stops at the intersection if the calculated regenerative energy is larger than charging energy required for putting the storage battery into the full charge state.

3. The driving support device according to claim 2, wherein the operation of acquiring the charge state comprises acquiring a charging stop state of the storage battery, and the specifying operation comprises specifying the inertia time zone from a time point of acquisition if the charging stop state is acquired.

4. The driving support device according to claim 3, wherein the operation of acquiring the charge state comprises acquiring a charging start state of the storage battery, and the specifying operation comprises specifying the regeneration time zone from a time point of acquisition if the charging start state is acquired.

5. The driving support device according to claim 4, wherein the operations further comprise adjusting a regenerative power generation amount so that the storage battery is put into the full charge state when the vehicle stops at the intersection if it is determined that the vehicle is caused to stop at the intersection and the vehicle performs running accompanied with regenerative braking.

6. The driving support device according to claim 2, wherein the operations further comprise adjusting a regenerative power generation amount so that the storage battery is put into the full charge state when the vehicle stops at the intersection if it is determined that the vehicle is caused to stop at the intersection and the vehicle performs running accompanied with regenerative braking.

7. The driving support device according to claim 3, wherein the operations further comprise adjusting a regenerative power generation amount so that the storage battery is put into the full charge state when the vehicle stops at the intersection if it is determined that the vehicle is caused to stop at the intersection and the vehicle performs running accompanied with regenerative braking.

8. The driving support device according to claim 2, wherein the specifying operation comprises specifying the regeneration time zone if the calculated regenerative energy is smaller than charging energy required for putting the storage battery into the full charge state.

9. The driving support device according to claim 1, wherein the specifying operation comprises specifying the inertia time zone if it is determined that the vehicle is caused to pass through the intersection.

10. The driving support device according to claim 9, wherein the operations further comprise calculating a target speed satisfying the entry condition, wherein the specifying operation comprises specifying the inertia time zone from a time point when the vehicle accelerates or decelerates and a speed of the vehicle reaches the target speed.

11. The driving support device according to claim 1, wherein the operations further comprise performing control operations so that the vehicle performs running accompanied with regenerative braking or inertia running depending on the regeneration time zone or the inertia time zone.

12. A driving support system comprising:
a driving support device; and
a transmitting device for transmitting signal information of a traffic signal located at an intersection,
wherein the driving support device is constructed to receive signal information transmitted from the transmitting device,
the driving support device comprises:
a non-transitory computer readable memory;
a hardware processor coupled to the non-transitory computer readable memory and configured to read instructions from the non-transitory computer readable memory to cause the driving support device to perform operations comprising:
acquiring speed information of the vehicle;
acquiring information on a distance between the vehicle and the intersection;
judging a dangerous running state to be determined by a stop condition for causing the vehicle to stop in front of the intersection and an entry condition for causing the vehicle to enter the intersection, on the basis of the distance to the intersection, the speed of the vehicle, and the signal information;
determining whether to cause the vehicle to stop at the intersection or to pass through the intersection if it is judged that the vehicle is in the dangerous running state;
acquiring a charge state of a storage battery mounted on the vehicle; and
specifying a regeneration time zone when running accompanied with regenerative braking is performed or an inertia time zone when inertia running is performed, before the vehicle arrives at the intersection, depending on a result of the determining operation,
wherein the specifying operation comprises specifying the regeneration time zone or the inertia time zone depending on the charge state.

13. A driving support method for receiving signal information of a traffic signal located at an intersection and supporting driving of a vehicle, comprising the steps of:
acquiring speed information of the vehicle;
acquiring, information on a distance between the vehicle and the intersection;
judging a dangerous running state to be determined by a stop condition for causing the vehicle to stop in front of the intersection and an entry condition for causing the vehicle to enter the intersection, on the basis of the distance to the intersection, the speed of the vehicle, and the signal information;
determining whether to cause the vehicle to stop at the intersection or to pass through the intersection if it is judged that the vehicle is in the dangerous running state;
acquiring a charge state of a storage battery mounted on the vehicle; and
specifying a regeneration time zone when running accompanied with regenerative braking is performed or an inertia time zone when inertia running is performed, before the vehicle arrives at the intersection, depending on a result of the determining step,
wherein the specifying step comprises specifying the regeneration time zone or the inertia time zone depending on the charge state.

* * * * *